US008111191B2

(12) United States Patent
Falk

(10) Patent No.: US 8,111,191 B2
(45) Date of Patent: Feb. 7, 2012

(54) WIDEBAND ANTENNA PATTERN

(75) Inventor: Kent Falk, Göteborg (SE)

(73) Assignee: Saab AB (SE)

( * ) Notice: Subject to any disclaimer, the term of this patent is extended or adjusted under 35 U.S.C. 154(b) by 251 days.

(21) Appl. No.: 12/366,351

(22) Filed: Feb. 5, 2009

(65) Prior Publication Data

US 2009/0201214 A1 Aug. 13, 2009

(30) Foreign Application Priority Data

Feb. 7, 2008 (EP) .................................... 08446502

(51) Int. Cl.
*G01S 3/16* (2006.01)

(52) U.S. Cl. ...................................................... 342/383

(58) Field of Classification Search .................. 342/383
See application file for complete search history.

(56) References Cited

U.S. PATENT DOCUMENTS

| | | | | |
|---|---|---|---|---|
| 4,044,359 | A | 8/1977 | Applebaum et al. | |
| 4,246,585 | A * | 1/1981 | Mailloux | 342/373 |
| 5,343,211 | A | 8/1994 | Kott | |
| 5,592,178 | A | 1/1997 | Chang et al. | |
| 5,805,106 | A | 9/1998 | Baum | |
| 6,115,409 | A | 9/2000 | Upadhyay et al. | |
| 6,121,915 | A | 9/2000 | Cooper et al. | |
| 6,359,923 | B1 * | 3/2002 | Agee et al. | 375/130 |
| 6,624,783 | B1 * | 9/2003 | Rabideau | 342/195 |
| 7,129,888 | B1 | 10/2006 | Chesley | |
| 7,221,239 | B2 * | 5/2007 | Runyon | 333/117 |
| 2003/0025633 | A1 | 2/2003 | Cai et al. | |
| 2003/0179139 | A1 * | 9/2003 | Nemit et al. | 342/383 |
| 2006/0208945 | A1 * | 9/2006 | Kolanek | 342/377 |
| 2007/0296625 | A1 | 12/2007 | Bruzzone et al. | |
| 2009/0256749 | A1 | 10/2009 | Falk | |

FOREIGN PATENT DOCUMENTS

| | | | |
|---|---|---|---|
| EP | 0308229 | A2 | 3/1989 |
| EP | 0618641 | A2 | 10/1994 |
| EP | 0618641 | A2 * | 10/1994 |
| EP | 2088449 | A1 | 8/2009 |
| JP | 2003098251 | A | 4/2003 |
| WO | WO-87/07389 | A2 | 12/1987 |
| WO | WO-2006/041338 | A1 | 4/2006 |
| WO | WO-2006/130682 | A1 | 12/2006 |
| WO | WO-2011/008146 | A1 | 1/2011 |

OTHER PUBLICATIONS

"European Application No. 084465020, Communication and European Search Report mailed Oct. 1, 2008", 13 pgs.

(Continued)

*Primary Examiner* — Thomas Tarcza
*Assistant Examiner* — Frank McGue
(74) *Attorney, Agent, or Firm* — Schwegman, Lundberg & Woessner, P.A.

(57) ABSTRACT

Embodiments of the invention include a method to control an antenna pattern of a wideband array antenna wherein a wideband array antenna unit comprising the wideband array antenna and transforming means is accomplished. Embodiments of the invention further include the corresponding wideband array antenna unit and transforming means arranged to control an antenna pattern of an antenna system. The separation between antenna elements in the wideband array antenna can be increased to above one half wavelength of a maximum frequency within a system bandwidth when the array antenna is arranged to operate with an instantaneously wideband waveform.

93 Claims, 14 Drawing Sheets

OTHER PUBLICATIONS

"European Application No. 084465020, Communication and Partial European Search Report mailed Aug. 6, 2008", 7 pgs.
Er, M. H., "An Alternative Implementation of Quadratically Constrained Broadband Beamformers", *Signal Processing*, 21(2), (1990),117-127.
Frank, J., et al., "Broadband Phased Array Concepts", *Digest of the Antennas and Propagation Society International Symposium*, vol. 2, (1994),1228-1231.
Kim, Y. S., et al., "Bandwidth Performance of 16-Element Thinned Phased Array with Tapped Delay-Line Filter", *IEEE Transactions on Antennas and Propagation*, 39(4), (1991),562-565.
Lin, F. C., et al., "Band-Partitioned Sidelobe Canceller for a Wideband Radar", *Proceedings of the 2003 IEEE Radar Conference*, (2003),310-314.
"U.S. Appl. No. 12/366,335, Non Final Office Action mailed Jun. 23, 2011", 11 pgs.
"U.S. Appl. No. 12/366,335, Response filed Oct. 24, 2011 to Non Final Office Action mailed Jun. 23, 2011", 34 pgs.
"European Application Serial No. 08446502.0, Office Action mailed Jan. 14, 2011", 4 pgs.
"European Application Serial No. 08446502.0, Office Action mailed Feb. 10, 2010", 1 pg.
"European Application Serial No. 08446502.0, Response filed Jun. 8, 2010 to Office Action mailed Feb. 10, 2010", 50 pgs.
"European Application Serial No. 08446502.0, Response filed Jul. 14, 2011 to Office Action mailed Jan. 14, 2011", 41 pgs.
"European Application Serial No. 08446503.8, Communication and European Search Report mailed Jun. 19, 2008", 10 pgs.
"European Application Serial No. 08446503.8, Office Action mailed Feb. 10, 2010", 1 pg.
"European Application Serial No. 08446503.8, Response filed Jun. 8, 2010 to Office Action mailed Feb. 10, 2010", 36 pgs.
"European Application Serial No. 10174353.2, Office Action and European Search Report mailed Jan. 17, 2011", 6 pgs.
"European Application Serial No. 10174353.2, Office Action mailed Sep. 9, 2010", 3 pgs.
"European Application Serial No. 10174353.2, Response dated Jul. 21, 2011 and filed Jul. 22, 2011, filed in reply to Office Actions mailed Feb. 21, 2011 and Jan. 17, 2011", 19 pgs.
"European Application Serial No. 10174353.2, Response filed Nov. 4, 2010 to Office Action mailed Srp. 9, 2010", 48 pgs.
Dawood, M., et al., "Generalised wideband ambiguity function of a coherent ultrawideband random noise radar", *IEE Proceedings, Radar, Sonar Navigation*, 150(5), (2003), 379-386.
Li, R., et al., "Adaptive Channel Compensation Based on Bandwidth Partitioning", *Proceedings, 6th International Conference on Signal Processing* (*ICSP' 02*), vol. 1, (2002), 329-333.
Vouras, P. G., et al., "Principal Component Filter Bank for Band Partitioned Sidelobe Cancellation", *Proceeding IEEE International Radar Conference*, (2005), 691-696.
"European Application Serial No. 08446502.0, Summons to Attend Oral Proceedings mailed Dec. 2, 2011", 4 pgs.
"European Application Serial No. 10174353.2, Office Action mailed Nov. 28, 2011", 5 pgs.
"European Application Serial No, 08446503.8, Communication under Rule 71(3) EPC 'mailed Dec. 6, 2011", 45 pgs.

* cited by examiner

WIDEBAND ANTENNA PATTERN

RELATED

This application claims priority under 35 U.S.C. 119 to European Patent Application No. EPO 08446502.0, filed 7 Feb. 2008, which application is incorporated herein by reference and made a part hereof.

TECHNICAL FIELD

The invention relates to the field of Wideband array antennas.

BACKGROUND ART

It is often desired to control the direction and shape of one or several main lobe/lobes, the side lobe level in different directions and cancellation directions of an array antenna. This can be accomplished with phase shifters which allow narrow band control of the main lobe, side lobe level and also to control the positions of several narrow band cancellation directions in the antenna pattern of the array antenna. A cancellation direction is a direction in the antenna diagram where the radiated or received power has a minimum. True time delay solutions are also used today. In these solutions each antenna element has a fixed time delay for all frequencies. The fixed time delay can be different for different antenna elements. These solutions make it possible to control a wideband main lobe but it is only possible to create narrow band cancellation directions in the antenna pattern. In order to create a cancellation direction over a wide frequency range several narrow band cancellation directions have to be designed around the desired wideband cancellation direction. This leads to the unwanted side effect that the level of side lobes is increased. In many applications such as radar antennas it is desirable to achieve a wideband lobe forming while keeping the side lobes at a low level.

In prior art solutions today methods thus exist to control an antenna pattern of an array antenna connected to an electronic system and comprising at least two antenna elements. The antenna pattern control comprises control of the directions of one or several main lobe/s and/or cancellation directions in the antenna pattern. The control is achieved by affecting waveforms between the antenna elements and the electronic system with phase shifts or time delays being individual for each antenna element. The electronic system can be a radar or communications system. The connection between the array antenna and the electronic system can be made directly or indirectly via e.g. phase shifters. The drawbacks however being that the antenna pattern control only allow narrow band control of the main lobe, side lobe level and also only allow creation of narrow band cancellation directions in the antenna pattern.

There is thus a need for an improved solution to control the antenna pattern of a wideband array antenna or antenna system by being able to control the antenna pattern over a wide bandwidth by controlling characteristics such as the shape, direction and width of one or several main lobe/lobes and the side lobe levels in different directions as well as being able to create a number of wideband cancellation directions in the antenna pattern.

SUMMARY OF THE INVENTION

The object of the invention is to remove the above mentioned deficiencies with prior art solutions and to provide:

- a method to control an antenna pattern of a wideband array antenna
- a wideband array antenna unit arranged to control an antenna pattern of a wideband array antenna
- a transforming means arranged to control an antenna pattern of an antenna system
- a wideband array antenna arranged to control an antenna pattern of the wideband array antenna to solve the problem to achieve an improved solution to control the antenna pattern of a wideband array antenna or antenna system over a wide bandwidth. The antenna pattern control comprising controlling characteristics such as the shape, direction and width of one or several main lobe/lobes and the side lobe levels in different directions as well as being able to create a number of wideband cancellation directions in the antenna pattern.

This object is achieved by providing a method to control an antenna pattern of a wideband array antenna connected to an electronic system and comprising at least two antenna elements. The antenna pattern control comprises control of the directions of one or several main lobe/s and/or cancellation directions in the antenna pattern. The control is achieved by affecting waveforms between the antenna elements and the electronic system with phase shifts or time delays being individual for each antenna element wherein a wideband array antenna unit, comprising the wideband array antenna and transforming means, the wideband array antenna being operational over a system bandwidth and operating with an instantaneous bandwidth B, is accomplished by:

- the transforming means being inserted between each antenna element or sub array in the wideband array antenna and the electronic system (303), a sub array comprising at least two antenna elements, or the transforming means being integrated in the antenna element/sub array or the electronic system,
- a weighting function W(ω) being calculated for Q spectral components q, resulting from dividing the instantaneous bandwidth B in Q components, q being an integer index ranging from 0 to Q−1, for each antenna element or sub array using standard methods taking into account design requests valid for a centre frequency $f_q$ of each spectral component and
- the transforming means affecting the waveforms between each antenna element or sub array ($E_1$-$E_N$) and the electronic system (303), the waveforms being continuous or pulsed, by use of one or several parameters calculated from the weighting function W(ω) at discrete angular frequencies $\omega_q$ thus achieving extended control of the antenna pattern of the wideband array antenna over the instantaneous bandwidth B the extended control comprising the control of direction and width of one or several main lobe/s having frequency independent position and control of a number of wideband cancellation directions.

The object is further achieved by providing a wideband array antenna unit arranged to control an antenna pattern of a wideband array antenna connected to an electronic system and comprising at least two antenna elements. The antenna pattern control comprises control of the directions of one or several main lobe/s and/or cancellation directions in the antenna pattern. The antenna pattern control being arranged to be achieved by affecting waveforms between the antenna elements and the electronic system with phase shifts or time delays being individual for each antenna element wherein the wideband array antenna unit, comprising the wideband array antenna and transforming means, the wideband array antenna being arranged to be operational over a system bandwidth and being arranged to operate with an instantaneous bandwidth B, is accomplished by:

- the transforming means being arranged between each antenna element or sub array in the wideband array antenna and the electronic system, a sub array comprising at least two antenna elements, or the transforming means being integrated in the antenna element/sub array or the electronic system, a weighting function W(ω) being arranged to be calculated for Q spectral components q, resulting from dividing the instantaneous bandwidth B in Q components, q being an integer index ranging from 0 to Q−1, for each antenna element or sub array using standard methods taking into account design requests valid for a centre frequency $f_q$ of each spectral component and the transforming means being arranged to affect the waveforms between each antenna element or sub array and the electronic system (303), the waveforms being continuous or pulsed, by use of one or several parameters calculated from the weighting function W(ω) at discrete angular frequencies $\omega_q$ thus achieving extended control of the antenna pattern of the wideband array antenna over the instantaneous bandwidth B the extended control comprising the control of direction and width of one or several main lobe/s having frequency independent position and control of a number of wideband cancellation directions.

The object is further achieved by providing a transforming means arranged to control an antenna pattern of an antenna system connected to an electronic system, the antenna system comprising at least two antenna elements, the antenna pattern control comprising control of the directions of one or several main lobe/s and/or cancellation directions in the antenna pattern, the control being arranged to be achieved by affecting waveforms between the antenna elements and the electronic system with phase shifts or time delays being individual for each antenna element wherein an extended control of the antenna pattern arranged to occupy an instantaneous bandwidth B is accomplished by:

the transforming means being arranged between at least all but one of the antenna elements or sub arrays ($E_1$-$E_N$) in the antenna system and the electronic system, a sub array comprising at least two antenna elements, or the transforming means being integrated in the antenna element/sub array or the electronic system, a weighting function W(ω) arranged to be calculated for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component, and the transforming means arranged to affect the waveforms between at least all but one of the antenna elements or sub arrays ($E_1$-$E_N$) and the electronic system, the waveforms being continuous or pulsed, by use of one or several parameters calculated from the weighting function W(ω) at discrete angular frequencies $\omega_q$ thus achieving the extended control of the antenna pattern of the antenna system over the instantaneous bandwidth B the extended control comprising the control of direction and width of one or several main lobe/s having frequency independent position and control of a number of wideband cancellation directions.

The object is further achieved by providing a wideband array antenna arranged to be operational over a system bandwidth and comprising at least two antenna elements. The wideband array antenna is arranged to control an antenna pattern of the wideband array antenna and is connected to an electronic system. The antenna pattern control is arranged to be achieved by affecting waveforms between the wideband array antenna and the electronic system with parameters being individual for each antenna element wherein the wideband array antenna is arranged to operate with a waveform having an instantaneous bandwidth B by a separation between the antenna elements in the wideband array antenna being increased compared to conventional array antenna designs to above one half wavelength of a maximum frequency within the system bandwidth when the wideband array antenna is arranged to operate with an instantaneously wideband waveform. This results in a substantially reduced number of antenna elements without the appearance of grating lobes in the antenna pattern.

Further advantages are achieved by implementing one or several of the features of the dependent claims which will be explained in the detailed description. Some of these advantages are:

The invention provides an extended control of the antenna pattern comprising control of characteristics such as the shape, direction and width of one or several main lobe/lobes and the side lobe levels in different directions as well as creation of a number of wideband cancellation directions in the antenna pattern.

The invention can be implemented with either an analogue or a digital realization of the transforming means.

The invention is applicable to both continuous and pulsed waveforms which is a further advantage.

Additional advantages are achieved if features of one or several of the dependent claims not mentioned above are implemented.

DETAILED DESCRIPTION

Embodiments of the invention will now be described in detail with reference to the enclosed drawings. Embodiments of the invention will be explained by describing a number of examples of how the antenna pattern can be shaped over a wide bandwidth. This is accomplished by affecting waveforms to the antenna elements in the transmit mode or from the antenna elements in the receive mode with certain parameters as will be explained further.

A wideband cancellation direction is henceforth in the description used as a direction in the antenna pattern where the radiated power/sensitivity has a minimum being substantially below the radiated power/sensitivity in the direction having the maximum radiation/sensitivity.

An antenna pattern is defined as radiated power as a function of direction when the antenna is operated in transmit mode and as sensitivity as a function of directions when the antenna is operated in receive mode.

Figure 1A:
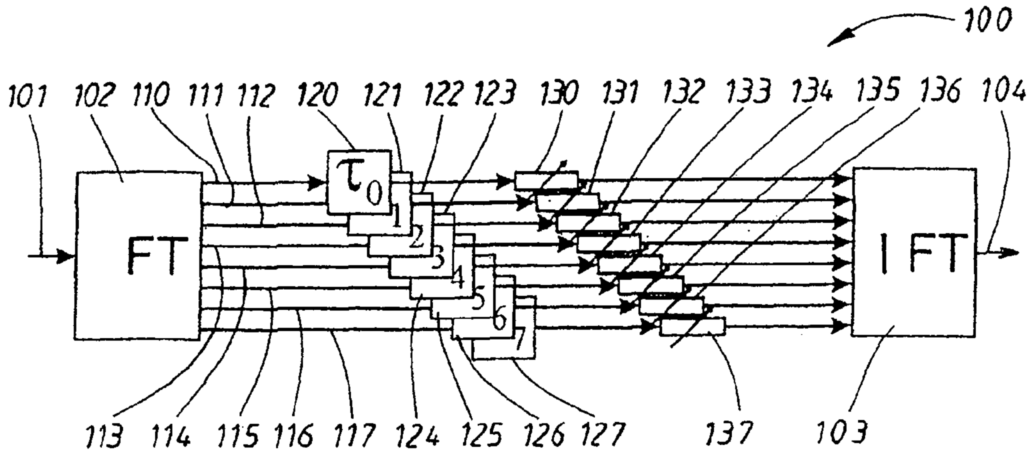
FIG. 1*a* schematically shows a digital solution of a realization of the transforming means in the frequency domain.

FIG. 1*a* schematically shows an example of a practical realization of a frequency dependent "true time delay" solution for a wideband array antenna. A wideband array antenna is defined as an array antenna having a bandwidth greater than or equal to an instantaneous operating bandwidth B.

The instantaneous bandwidth B is the instantaneous operating bandwidth which will be described further in association with FIG. 3. In this example a time delay is used as a parameter being frequency dependent. The wideband array antenna comprises at least two antenna elements. The realization also includes an optional frequency dependent attenuation/amplification, i.e. the amplitudes of the waveforms are attenuated or amplified. In this optional embodiment two frequency dependent parameters are used; time delay and attenuation/amplification. Due to the reciprocity principle of antennas the inventive solution is applicable both for transmission and reception if not otherwise stated. Henceforth in the description the invention will be described for the receive mode if not otherwise stated. An input waveform $s_{in}(t)$, 101, from an antenna element n in the wideband array antenna is fed to a Fourier Transformation (FT) unit 102 using for example a Fast Fourier Transformation (FFT), but other methods for calculation of the spectrum could be used. The FT unit transforms the instantaneous bandwidth B of the input waveform $s_{in}(t)$, 101, into Q spectral components 0 to Q−1, in this example into 8 spectral components 110-117, each spectral component having a centre frequency $f_q$. However the transformation can be made into more or less spectral components. The time delay $\tau_q$, (120-127) and the optional frequency dependent attenuation/amplification $a_q$ (130-137) are affecting each spectral component q through any suitable time delay and/or attenuation/amplification means well known to the skilled person. The spectral component 110 thus has a time delay $\tau_0$, 120, and an attenuation/amplification $a_0$, 130, the spectral component 111 a time delay $\tau_1$, 121, and an attenuation/amplification $a_1$, 131, and so on until the spectral component 117 having a time delay $\tau_7$, 127, and an attenuation/amplification $a_7$, 137. All spectral components are fed to an Inverse Fourier Transformation (IFT) unit, 103, using Inverse Fast Fourier Transformation (IFFT) or any other method, as for example IDFT (Inverse Discrete Fourier Transformation), transforming from the frequency domain to the time domain thus transforming all the spectral components back into the time domain and producing an output waveform $s_{out}(t)$, 104.

The time delay $\tau_q$ and the attenuation/amplification $a_q$ are examples of parameters for antenna element n affecting each spectral component q where the parameters are frequency dependent. The general designation for these frequency dependent parameters are $\tau_{n,q}$ and $a_{n,q}$ where n ranges from 1 to N and q from 0 to Q−1.

The FT unit, the time delay and attenuation/amplification means and the IFT unit are parts of a first control element 100.

The invention can be implemented using only the frequency depending time delay $\tau(\omega)$. This solution is simpler to realize as the frequency depending attenuation/amplification is not required. However it heavily reduces the control of the main lobe width.

The function of the implementation with both the frequency dependent time delay and the attenuation/amplification according to FIG. 1*a* will now be described.

Parameters calculated from a frequency dependent weighting function $W(\omega)=A(\omega)\cdot e^{-j\cdot\omega\cdot\tau(\omega)}$ is affecting the waveforms between each antenna element n and the electronic system where $A(\omega)$, accounts for the frequency dependency of the attenuation/amplification and $\tau(\omega)$ account for the frequency dependency of the time delay. As an alternative the weighting function could be defined as $W(\omega)=A(\omega)\cdot e^{-j\cdot\phi(\omega)}$ where $A(\omega)$, still accounts for the frequency dependency of the attenuation/amplification and $\phi(\omega)$ account for the frequency dependency of the phase shift. Each antenna element is connected to one first control element 100. The output waveform $s_{out}(t)$ 104 emitted from each first control element 100 as a function of the input waveform $s_{in}(t)$ 101 entering the first control element can be calculated with the aid of equation (1). $s_{in}(t)$ is the video-, intermediate frequency-(IF) or radio frequency (RF)-waveform from each antenna element when the antenna is working as a receiving antenna, but can also be the waveform on video, intermediate frequency (IF) or radio frequency (RF) level from a waveform generator in an electronic system when the wideband array antenna is working as a transmitting antenna.

$$s_{out}(t) = \underbrace{\frac{1}{2\cdot\pi}\cdot\int_{-\infty}^{\infty} W(\omega)\cdot \underbrace{\int_{-\infty}^{\infty} s_{in}(\tau)\cdot e^{-j\cdot\omega\cdot\tau}\cdot d\tau}_{\text{Fourier transform of } s_{in}(\tau)}\cdot e^{j\cdot\omega\cdot t}\cdot d\omega}_{\text{Invers Fourier transform back to the time domain}} = \tag{1}$$

$$\int_{-\infty}^{\infty} s_{in}(\tau)\cdot \underbrace{\frac{1}{2\cdot\pi}\cdot\int_{-\infty}^{\infty} W(\omega)\cdot e^{j\cdot\omega\cdot(t-\tau)}\cdot d\omega}_{\text{Invers Fourier transform of } W(\omega)=w(t-\tau)}\cdot d\tau =$$

$$\int_{-\infty}^{\infty} s_{in}(\tau)\cdot w(t-\tau)\cdot d\tau = s_{in}(t)\otimes w(t)$$

In equation (1) the symbol ⊗ symbolize convolution. The principle of convolution is well known to the skilled person and can be further studied e.g. in "The Fourier Transform and its Applications", McGraw-Hill Higher Education, 1965 written by Ronald N. Bracewell.

The symbols used above and henceforth in the description have the following meaning:

$\omega$=angular frequency ($2\cdot\pi\cdot f$)

w(t)=time domain weighting function w(t−τ)=time delayed time domain weighting function W(ω)=frequency domain weighting function being the Fourier Transform of w(t)

A(ω)=absolute value of W(ω)

$a_q=A(\omega_q)$ absolute value of W(ω) at $\omega=\omega_q$ for antenna element n, generally designated $a_{n,q}$ τ=time delay and integration variable $\tau_q$=time delay of τ(ω) at $\omega=\omega_q$ for antenna element n, generally designated $\tau_{n,q}$=time delay for spectral component q in antenna element n τ(ω)=time delay as a function of ω

ϕ(ω)=phase shift as a function of ω

$\phi_q$=phase shift of ϕ(ω) at $\omega=\omega_q$ for antenna element n, generally designated $\phi_{n,q}$=phase shift for spectral component q in antenna element n As mentioned above $\tau_{n,q}$ and $a_{n,q}$ are examples of frequency dependent parameters for antenna element n affecting each spectral component q. The phase shift $\phi_{n,q}$ is another example of a frequency dependent parameter for antenna element n affecting each spectral component.

Figure 1B:
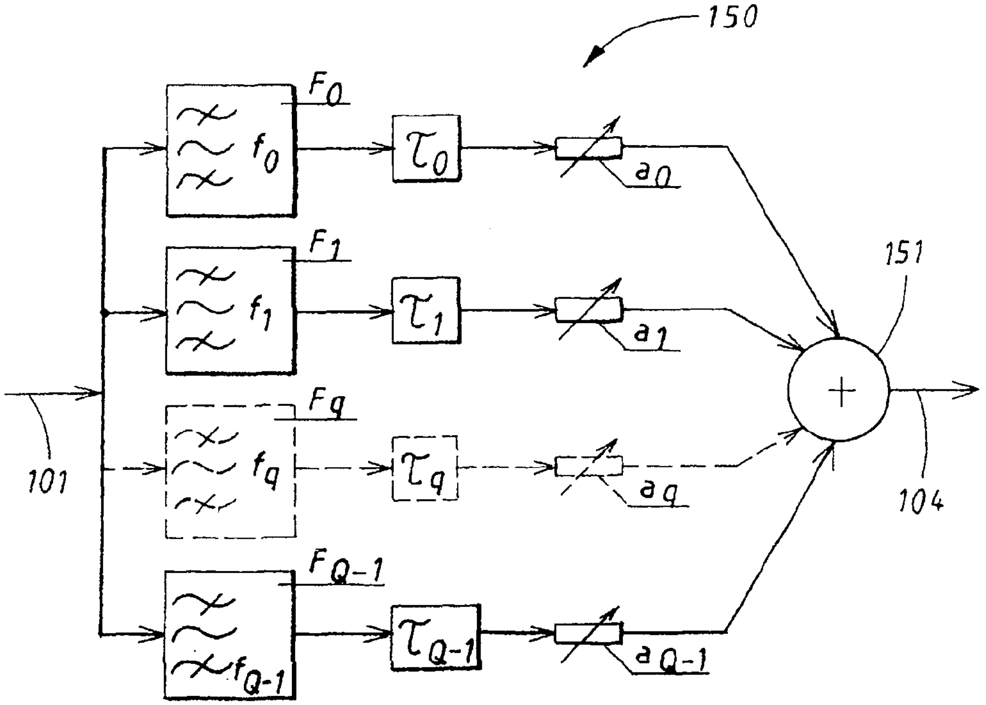
FIG. 1*b* schematically shows an analogue solution of a realization of the transforming means in the frequency domain.

FIG. 1*a* describes a digital realization of the first control element. FIG. 1*b* shows a corresponding analogue realization with the input waveform $s_{in}(t)$ 101 entering a third control element 150. The input waveform 101 coming from each antenna element n is fed to Q band pass filters $F_q$ having a centre frequency $f_q$ where q assumes integer values from 0 to Q−1. The input waveform 101 is thus split in Q spectral components and a time delay $\tau_q$ or alternatively a phase shift $\phi_q$ and the optional frequency dependent attenuation/amplification $a_q$ are affecting each spectral component through any suitable time delay or phase shift and attenuation/amplification means well known to the skilled person. All spectral components are connected to a summation network 151 producing the output waveform $s_{out}(t)$, 104. The centre frequency $f_q$ of each spectral component can be calculated according to:

$$f_q = f_c - \frac{B}{2} + \left(q + \frac{1}{2}\right)\cdot\frac{B}{Q}$$

for a case with equividistant spectral component division, where $f_c$ is the centre frequency in the frequency band with an instantaneous bandwidth B. The instantaneous bandwidth B is the instantaneous operating bandwidth. The third control element 150 comprises Q band pass filters $F_q$, means for time delay and amplification/attenuation as well as the summation network 151.

A further digital realization will now be described with reference to FIGS. 2*a* and 2*b*. In many situations a time discrete realization, with discrete steps T in time, might be preferable. An output waveform $s_{out}(m\cdot T)$ emitted from a second control element (200) can then be calculated with the aid of equation (2) as a function of an input waveform $s_{in}(m\cdot T)$ entering the second control element. The index m is an integer value increasing linearly as a function of time. $W(\omega_q)$ represents the time delay and attenuation/amplification at the centre frequency of spectral component q, see FIG. 1. The FFT and the IFFT described in association with FIG. 1*a*, both requiring $Q\cdot\log_2(Q)$ operations, are computational efficient methods for calculation of DFT (Discrete Fourier Transform) and IDFT (Inverse Discrete Fourier Transform), both requiring $Q^2$ operations. Q is as mentioned above the total number of spectral components. The output waveform is calculated as:

$$s_{out}(m\cdot T) = \underbrace{\frac{1}{Q}\cdot\sum_{q=0}^{Q-1} W(\omega_q)\cdot \underbrace{\sum_{k=0}^{Q-1} s_{in}(k\cdot T)\cdot e^{-j\cdot 2\cdot\pi\cdot k\cdot\frac{q}{Q}}}_{\text{DFT of the input signal } s_{in}(m\cdot T)}\cdot e^{j\cdot 2\cdot\pi\cdot q\cdot\frac{m}{Q}}}_{\text{IDFT back to the time domain}} = \tag{2}$$

$$\sum_{k=0}^{Q-1} s_{in}(k\cdot T)\cdot \underbrace{\frac{1}{Q}\cdot\sum_{q=0}^{Q-1} W(\omega_q)\cdot e^{j\cdot 2\cdot\pi\cdot q\cdot\frac{m-k}{Q}}}_{IDFT\{W(\omega_q)\}=w_{mod[(m-k),(Q-1)]}} =$$

$$\sum_{k=0}^{Q-1} s_{in}(k\cdot T)\cdot w_{mod[(m-k),(Q-1)]} = s_{in}(m\cdot T)\otimes w_{mod[m,(Q-1)]}$$

mod[x,y]=remainder after division of x by y $\omega_q=2\cdot\pi\cdot f_q$=discrete angular frequency Q=Number of spectral components k=integer raising variable used in the DFT and the IDFT m=integer raising variable for discrete time steps q=integer raising variable for spectral components and integer raising variable used in the DFT.

As can be seen in equation (2) the desired functionality in a time discrete realization can be achieved with Q operations.

FFT and DFT are different methods for Fourier Transformation (FT). IFFT and IDFT are corresponding methods for Inverse Fourier Transformation (IFT). As described above these methods have different advantages and the method most suitable for the application is selected. However any of the methods can be used when FT and/or IFT are/is required in the different embodiments of the invention.

Figure 2A:
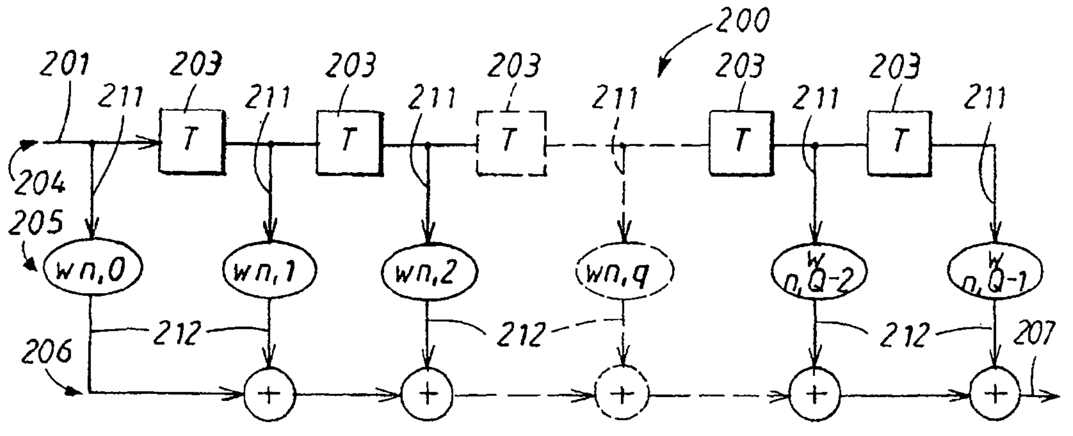
FIG. 2*a* schematically shows a realization of the transforming means in the time domain.

FIG. 2*a* shows the input waveform $s_{in}(m\cdot T)$ 201, coming from an antenna element in the wideband array antenna. The input waveform 201 is successively time delayed in Q−1 time steps T, 203, numbered from 1 to Q−1 and being time delayed copies of the input waveform $s_{in}(m\cdot T)$. The input waveform is thus successively time delayed with time steps T as illustrated in the upper part, 204, of FIG. 2*a*. Q parameters comprising weighting coefficients $w_{n,0}$ to $w_{n,Q-1}$, for antenna element n is identified with two indexes, the first representing antenna element number and the second a consecutive number q representing a spectral component and ranging from 0 to Q−1. The weighting coefficients are calculated as the IDFT of $W(\omega_q)$ or alternatively as the IFFT of $W(\omega_q)$ for the Q spectral components q, resulting from dividing the instantaneous bandwidth B in Q components, the calculation being performed for each antenna element or sub array ($E_1$-$E_N$) using standard methods and taking into account design requests valid for a centre frequency $f_q$ of each spectral component. The weighting coefficients $w_{n,0}$ to $w_{n,Q-1}$ thus is the weighting coefficient for antenna element n. The arrows 211 illustrate that the input waveform $s_{in}(m\cdot T)$ is multiplied with the first weighting coefficient $w_{n,0}$ and each time delayed copy of the input waveform is successively multiplied with the weighting coefficient having the same second index as the number of time step delays T included in the time delayed copy of the input waveform as illustrated in the middle part, 205, of FIG. 2*a*. The result of each multiplication is schematically illustrated to be moved, indicated with arrows 212, to the bottom part, 206, of FIG. 2*a*, where each multiplication result is summarized to the output waveform 207, $s_{out}(m\cdot T)$.

Figure 6A:
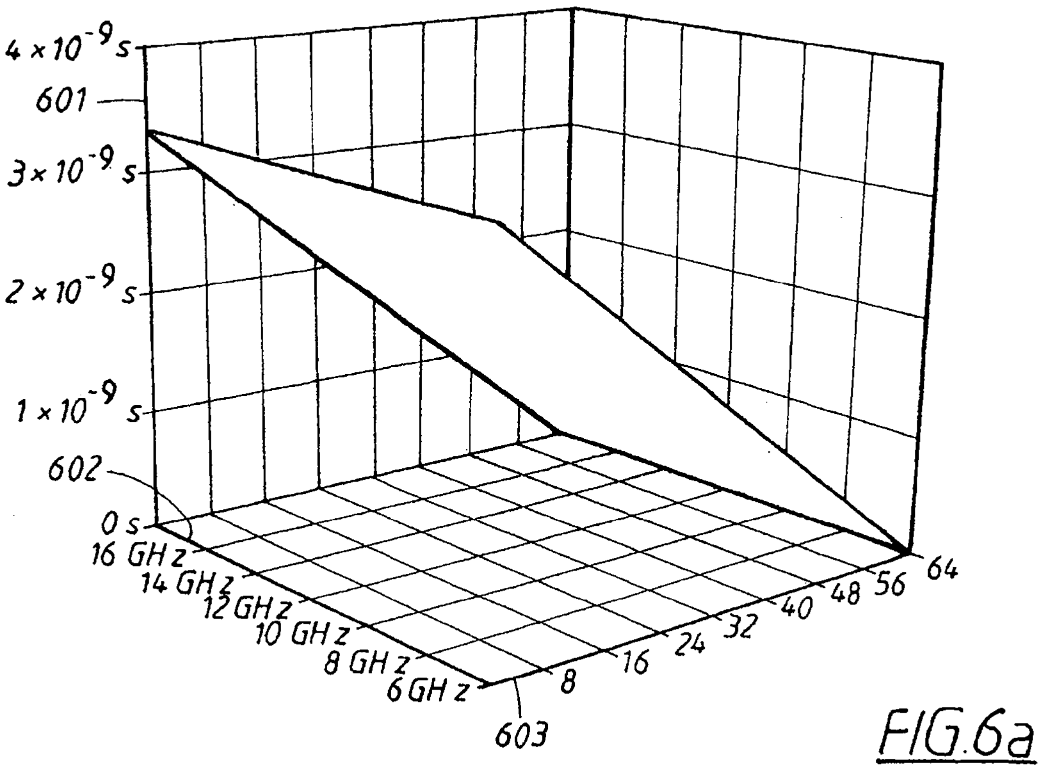
FIG. 6*a* schematically shows delay as a function of antenna element number and frequency.
Figure 6B:
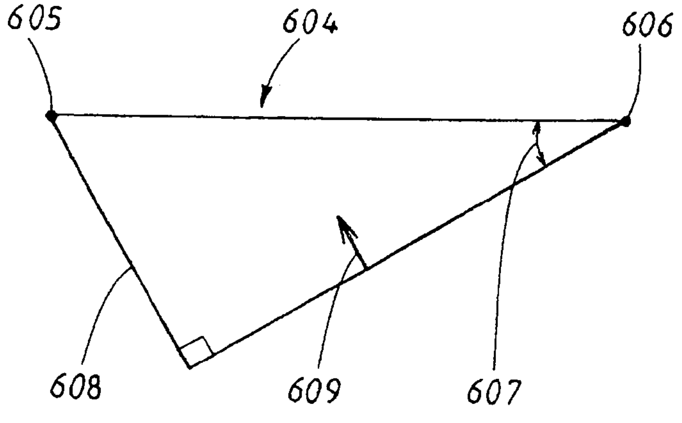
FIG. 6*b* schematically shows an incident wave front in a main lobe direction.
Figure 7:
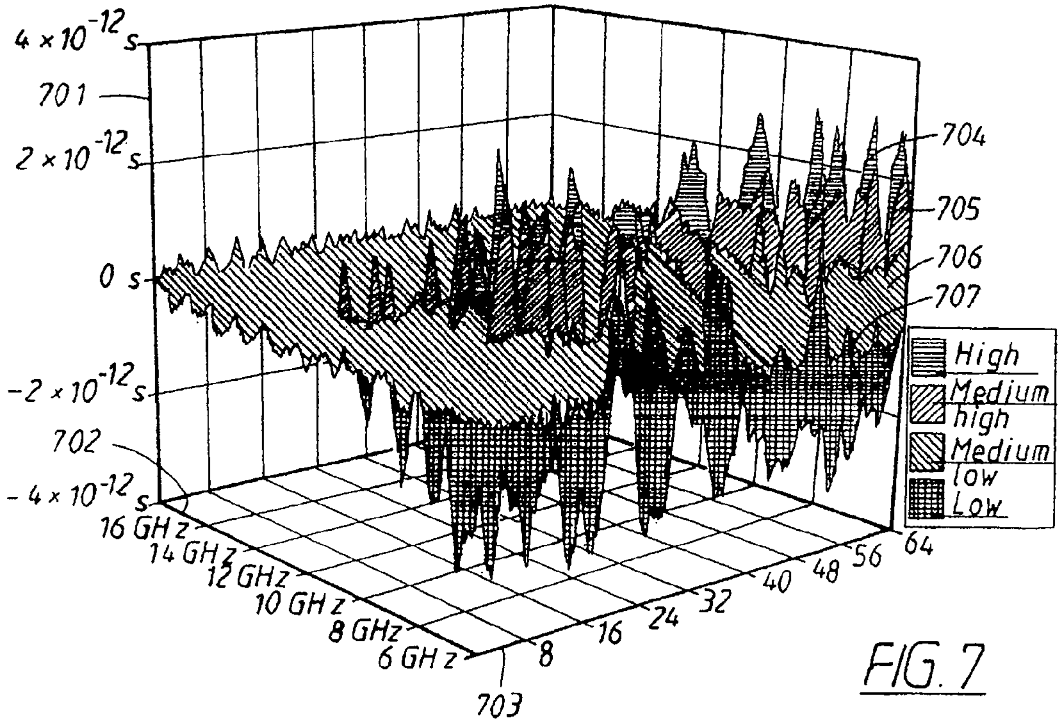
FIG. 7 schematically shows deviations from frequency independent true time delay ("delta delays") as a function of antenna element number and frequency.

As will be described in association with FIGS. 6 and 7 the dominating part of the time delay is not frequency dependent, resulting in many very small consecutive weighting coefficients, approximately equal to zero, at the beginning and end of the series of weighting coefficient $w_{n,0}$ to $w_{n,Q-1}$ for each antenna element. Assume that the first x weighting coefficients and the last y weighting coefficients in the series of weighting coefficients $w_{n,0}$ to $w_{n,Q-1}$ are approximately equal to zero. It could then be suitable in a hardware realization, to set the first x weighting coefficients and the last y weighting coefficients to zero and to integrate the first x time delays T into a time delay D, 202, equal to x·T as illustrated in FIG. 2*b*, and to exclude the last y multiplications to reduce the number of required operations to less than Q operations. FIG. 2*b* otherwise corresponds to FIG. 2*a*. The time delay D, 202, corresponds to the non frequency dependent time delay, for each antenna element, which is illustrated in FIG. 6*a*. The remaining frequency dependent time delay will onwards be called "delta time delay" as illustrated in FIG. 7. FIG. 2*b* is an example of a computational efficient convolution, for calculation of the "delta time delay", preceded of the frequency independent time delay D, 202, used mainly for control of the main lobe direction.

The means for realizing the frequency independent time delay D and the means for frequency dependent time delays and attenuations/amplifications for each time delay T, are parts of the second control element 200.

Figure 2B:
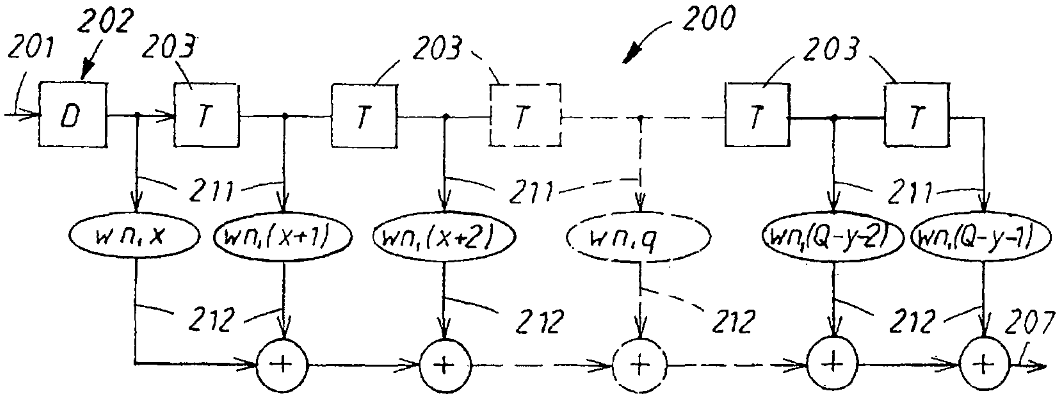
FIG. 2*b* schematically shows a realization in the time domain for an embodiment of the transforming means including also a dominating non frequency dependent "true time delay".
Figure 2C:
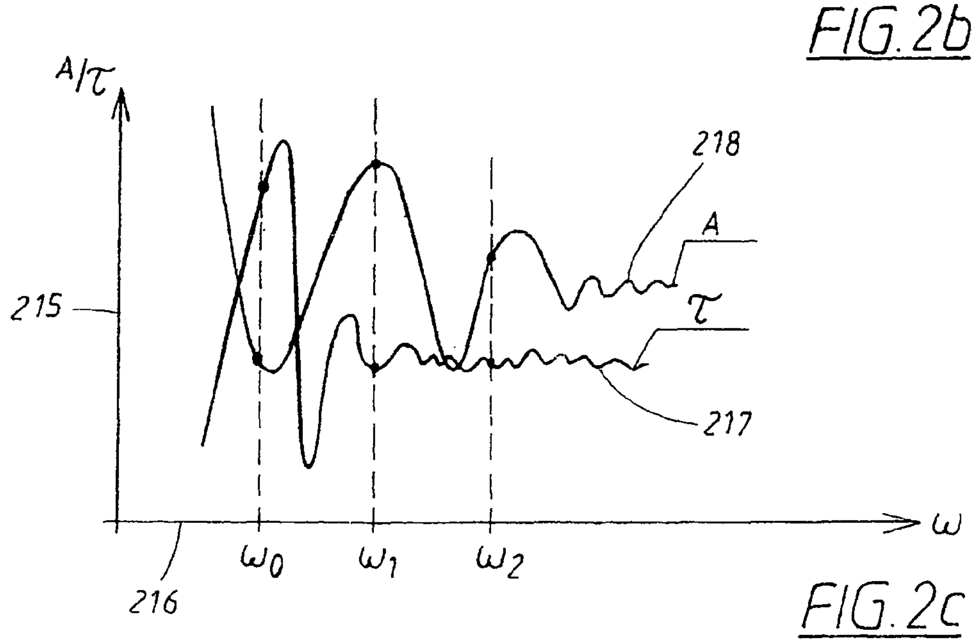
FIG. 2*c* shows a diagram of attenuation/amplification and time delays as a function of angular frequency ω (2·π·f).

FIG. 2*c* shows the frequency dependency of the time delay τ and attenuation A(ω) on the vertical axis 215 as a function of ω (i.e. 2·π·f) on the horizontal axis 216. The weighting function is calculated for each antenna element n and for a number of ω-values, $\omega_0$, $\omega_1$, $\omega_2$ . . . $\omega_{Q-1}$ through classical realization at each frequency using well known method as e.g. the Schelkunoff's method. This results in a number of values $W_{n,0}$, $W_{n,1}$, $W_{n,2}$ . . . for each antenna element n. The time delay as a function of ω then forms a curve 217 and the attenuation/amplification a curve 218. The weighting coefficients $w_{n,0}$, $w_{n,1}$, $w_{n,2}$ . . . are calculated as the IDFT or IFFT of $W_{n,0}$, $W_{n,1}$, $W_{n,2}$ . . . for each antenna element n.

FIG. 2*a* and 2*b* thus shows a realization of a frequency dependent time delay and attenuation/amplification in the time domain and FIGS. 1*a* and 1*b* shows a corresponding realization in the frequency domain. An advantage with the realization in the time domain is that only Q operations are required while the realization in the frequency domain requires $Q\cdot\log_2(Q)$ operations as described above.

A fourth control element applicable in the transmit mode can be realized by calculating the waveform in advance for each antenna element/sub array and for each spectral component q, q ranging from 0 to Q−1 using the intended waveform and the weighting function W(ω) for affecting the waveforms between each antenna element or sub array ($E_1$-$E_N$) and the electronic system 303. The result is converted in a DDS (Direct Digital Synthesis) unit to an analogue waveform which is fed to each antenna element/sub array. The means for calculating the waveform and the DDS unit are parts of the fourth control element.

All four control elements could as mentioned earlier be inserted either at video, intermediate frequency (IF) or directly on radio frequency (RF) level. It is easier to realize the control element at lower frequency but all hardware needed between the control element and the antenna element/sub array need to be multiplied with the number of antenna elements/sub arrays. In the description the invention is henceforth described as being realized at the RF level.

The four control elements are examples of transforming means, transforming an input waveform to an output waveform. The transforming means all have two ends, an input end receiving the input waveform and an output end producing the output waveform.

Figure 3A:
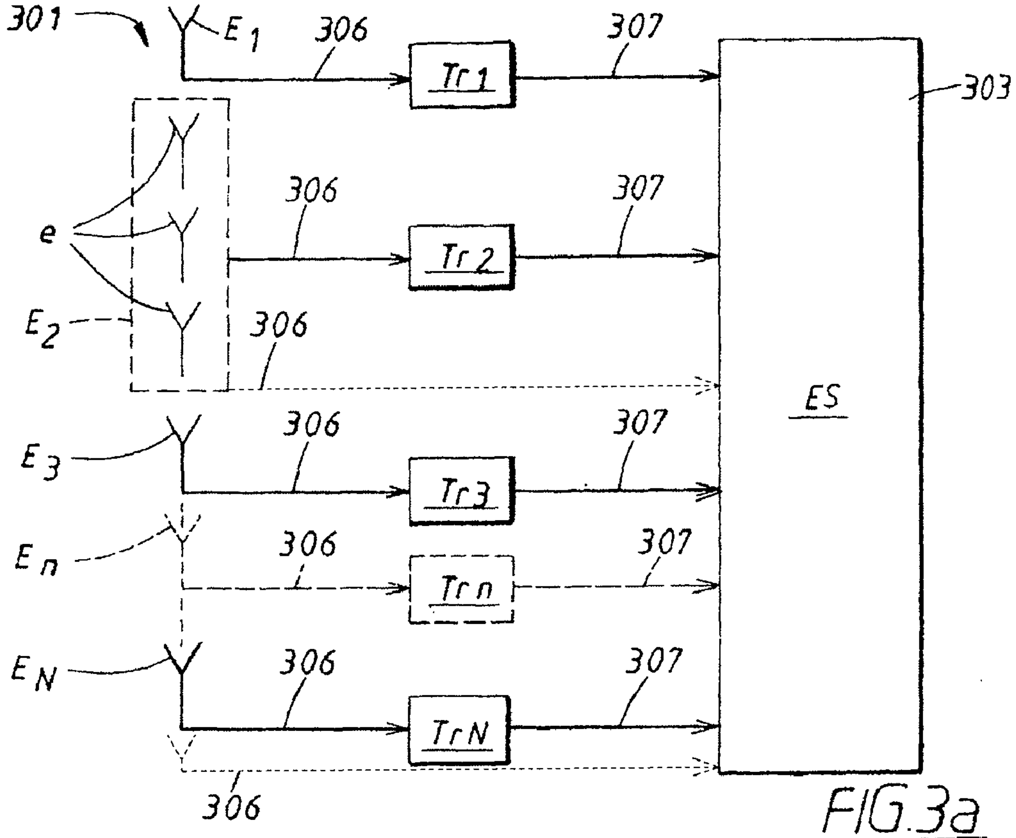
FIG. 3 schematically shows a block diagram of one embodiment of how the invention can be implemented.
Figure 3B:
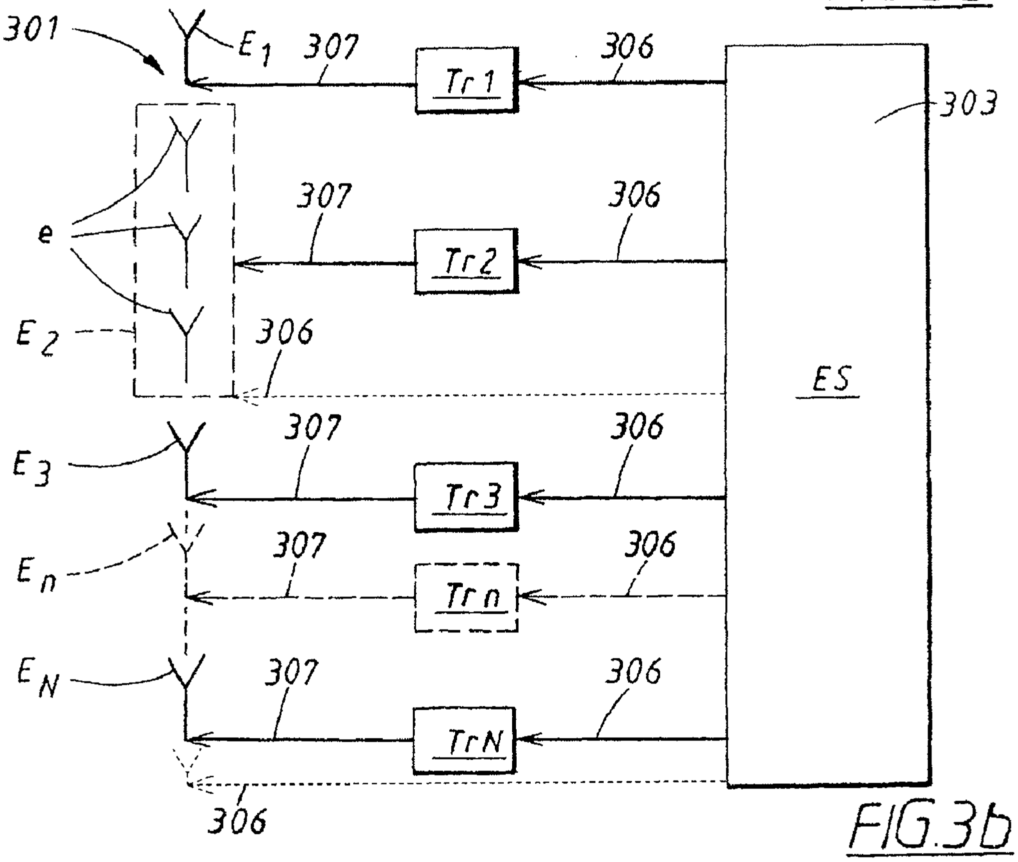

FIG. 3 schematically shows a block diagram of one embodiment of how the invention can be implemented. FIG. 3*a* shows the situation when the wideband array antenna 301 is working in receive mode. A wideband array antenna is defined as an array antenna having a bandwidth greater than or equal to the instantaneous operating bandwidth B. This bandwidth of the wideband array antenna is called the system bandwidth of an electronic system ES, 303 using the wideband array antenna. The instantaneous bandwidth B is the instantaneous operating bandwidth of the electronic system. The wideband array antenna can optionally comprise of one or several sub-arrays, each sub-array comprising two or more antenna elements. There are a total of N antenna elements or combinations of antenna elements and sub arrays, $E_1$ to $E_N$, and a corresponding number of transforming means $Tr_1$ to $Tr_N$. One transforming means is inserted between each antenna element or sub arrays and the electronic system ES, 303, which e.g. can be a radar system or a communication system. $Tr_1$ is inserted between $E_1$ and the electronic system, $Tr_2$ between $E_2$ and the electronic system and so on until $Tr_N$ being inserted between $E_N$ and the electronic system ES, i.e. $Tr_n$ is inserted between corresponding antenna element or sub array $E_n$ and the electronic system ES. A wideband array antenna unit is defined as the wideband array antenna and the transforming means. In FIG. 3*a* and 3*b* $E_2$ is a sub array comprising three antenna elements e. The input waveform in FIG. 3*a* $s_{in}(t)$ or $s_{in}(m\cdot T)$, 306, is emitted from each antenna element or sub array and fed to the corresponding transforming means. The output waveform $s_{out}(t)$ or $s_{out}(m\cdot T)$, 307, is fed to the electronic system 303. The waveforms 306 and 307 are individual for each antenna element or sub array.

FIG. 3*b* shows a corresponding block diagram when the wideband array antenna 301 is working in the transmit mode. The difference from FIG. 3*a* being that the input waveform $s_{in}(t)$ or $s_{in}(m\cdot T)$, 306, now is emitted from a waveform generator in the electronic system and fed to the transforming means, $Tr_1$ to $Tr_N$, and the output waveform $s_{out}(t)$ or $s_{out}(m\cdot T)$, 307, is fed to the antenna elements or sub arrays $E_1$ to $E_N$.

As mentioned above the transforming means are inserted between each antenna element or sub array and an electronic system ES. The transforming means are connected either directly or indirectly to an antenna element or sub array at one end and either directly or indirectly to the electronic system at the other end. In one embodiment when the transforming means are inserted at video level, one end of the transforming means can be directly connected to the electronic system and the other end indirectly connected to an antenna element or sub array via electronic hardware such as mixers. In another embodiment when the transforming means are inserted at RF-level one end of the transforming means can be directly connected to an antenna element or sub array and the other end directly to the electronic system. The required mixer hardware in this embodiment is included in the electronic system. In yet another embodiment when the transforming means are inserted at IF-level one end of the transforming means can be indirectly connected to an antenna element or sub array via electronic hardware such as mixers and the other end indirectly connected via electronic hardware such as mixers to the electronic system.

The transforming means can be separate units or integrated in the antenna elements or sub arrays or in the electronic system.

The transforming means can be arranged to achieve an extended control of an antenna pattern of the wideband array antenna or also of an antenna system. The antenna system is connected to the electronic system 303 and comprises at least two antenna elements. The extended antenna pattern control achieved comprises controlling characteristics such as the shape, direction and width of one or several main lobe/lobes and the side lobe levels in different directions as well as being able to create a number of wideband cancellation directions in the antenna pattern. The antenna system can comprise an array antenna with at least two antenna elements or a main antenna and an auxiliary antenna, each comprising of at least one antenna element. The main antenna of the antenna system can be any type of antenna comprising one or several antenna elements, e.g. a radar antenna. The auxiliary antenna of the antenna system can be a single antenna element or an array of antenna elements. Each antenna element can also be a sub array comprising at least two antenna elements. An extended wideband control of the antenna pattern occupying the instantaneous bandwidth B is accomplished by the transforming means 100, 200, 150, $Tr_1$-$Tr_N$ being arranged between at least all but one of the antenna elements or sub arrays ($E_1$-$E_N$) in the antenna system and the electronic system (303), or the transforming means being integrated in the antenna element/sub array or the electronic system. This means that all waveforms, or all waveforms but one, from antenna elements or sub arrays have to pass through the transforming means when the transforming means are implemented in the antenna system. The weighting function $W(\omega)=A(\omega)\cdot e^{-j\cdot\omega\cdot\tau(\omega)}$ or $W(\omega)=A(\omega)\cdot e^{-j\cdot\Phi(\omega)}$ is arranged to be calculated for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component. The transforming means 100, 200, 150, $Tr_1$-$Tr_N$ are arranged to affect the waveforms between at least all but one of the antenna elements or sub arrays ($E_1$-$E_N$) and the electronic system 303, by use of one or several parameters calculated from the weighting function W(ω) at discrete angular frequencies $\omega_q$ thus achieving control of the antenna pattern of the antenna system over the instantaneous bandwidth B. The waveforms can be continuous or pulsed.

In the situation where the antenna system comprises a main antenna with one antenna element, or sub array, and an auxiliary antenna with at least one antenna element it is sufficient that a transforming means is connected only to the antenna elements of the auxiliary antenna and that the output waveforms from the transforming means is added to the waveform of the main antenna, having no transforming means connected. The important aspect is that at least two waveforms are interacting, where all waveforms, or all waveforms but one, have been transmitted through a transforming means. In the case where one waveform is not affected by a transforming means this waveform serves as a reference and the parameters for the transforming means affecting the other waveforms are adapted to this reference.

Henceforth in the description the invention will be described as realized in the frequency domain as described in association with FIGS. 1*a* and 1*b*. The invention can however, as described in association with FIGS. 2*a* and 2*b*, also be realized in the time domain.

Henceforth in the description a wideband antenna pattern G(θ,ϕ) will be defined as the expected value of the waveform power $E[|A_\Sigma(\theta,\phi,t)|^2]$ as a function of the normal antenna pattern angle coordinates (θ,ϕ). The antenna element/sub array pattern $g_n(\theta,\phi)$, for antenna element/sub array n, is defined in a corresponding manner. In equation (3) the normalization of the antenna pattern is chosen to give $\max\{G(\theta,\phi)\}\equiv 1$.

$$G(\theta,\varphi\mid\forall s)=\frac{E[|A_\Sigma(\theta,\varphi,t)|^2]}{\max\{E[|A_\Sigma(\theta,\varphi,t)|^2]\}}\tag{3}$$

Figure 4:
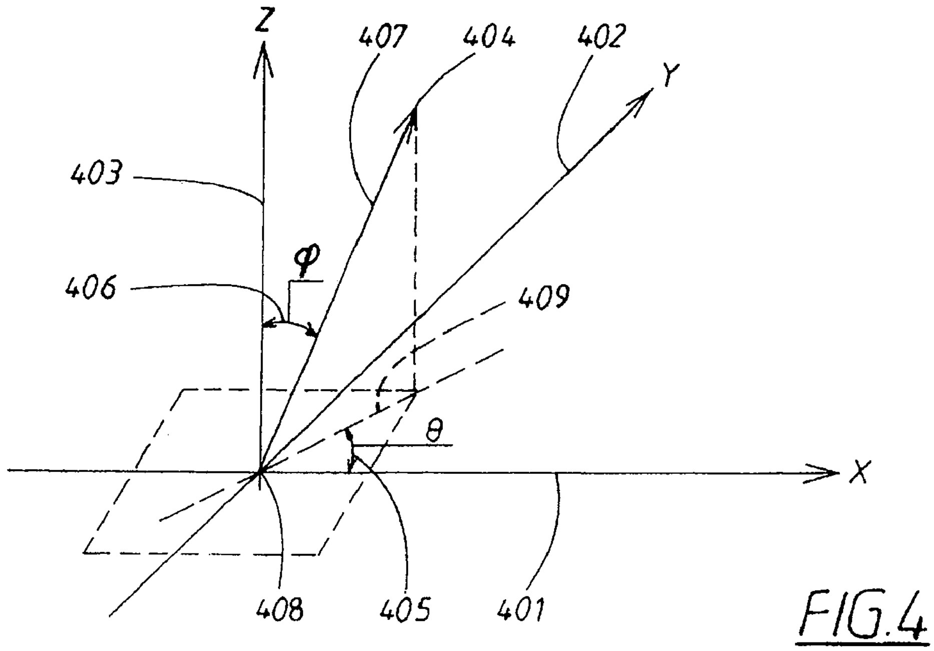
FIG. 4 shows the definition of angles ϕ and θ used in the definition of the wideband antenna pattern.

The angles θ and ϕ are defined as illustrated in FIG. 4. In a Cartesian coordinate system with X-axis 401, Y-axis 402 and Z-axis 403 the direction to a point 404 in space is defined by an angle θ, 405, and an angle ϕ, 406. The angle ϕ is the angle between a line 407 from the origin 408 to the point 404 and the Z-axis. The angle θ is the angle between the vertical projection, 409, of the line 407 on the X-Y plane and the X-axis.

$A_\Sigma(\theta,\phi,t)$ is the sum of the waveform amplitudes from all elements/sub arrays forming the antenna in the direction (θ,ϕ), see equation (4).

$$A_\Sigma(\theta,\varphi,t)=\sum_{n=1}^{N}\sqrt{g_n(\theta,\varphi\mid s_n)}\cdot s_n\left[t-\frac{R}{c_0}+\tau_n(\theta,\varphi)-\tau_n(\theta_s,\varphi_s)\right]\tag{4}$$

Following symbols are used:

$g_n(\theta,\phi|s)$ Element pattern for antenna elements/sub array n in the direction (θ,ϕ) given the waveform s being a function of t.

$g_m(\theta,\phi|s)$ Element pattern for antenna elements/sub array m in the direction (θ,ϕ) given the waveform s being a function of t.

$s_n(t)$ Waveform from antenna element/sub array n or from the electronic system as a function of time. This corresponds to $s_{in}(t)$ for antenna element or sub array n.

$s_m(t)$ Waveform from antenna element/sub array m or from the electronic system as a function of time. This corresponds to $s_{in}(t)$ for antenna element or sub array m.

R Distance to the probing point.

$c_0$ Speed of light.

$\tau_n$ Waveform time delay from/to antenna element/sub array n.

$\tau_m$ Waveform time delay from/to antenna element/sub array m.

$\theta_s$ Antenna scan angle in the θ-dimension.

$\phi_s$ Antenna scan angle in the ϕ-dimension.

$r_{n,m}$ Cross correlation function between the waveform from/to antenna element/sub array n and the waveform from/to antenna element/sub array m.

m Antenna element/sub array index ranging from 1 to N.

n Antenna element/sub array index ranging from 1 to N.

$g_m^*$ Complex conjugate of $g_m$ $s_m^*$ Complex conjugate of $s_m$

Note that $\max\{E[|A_\Sigma(\theta,\phi,t)|^2]\}$ is a constant and introduce the constant $K_D=\max\{E[|A_\Sigma(\theta,\phi,t)|^2]\}$ normalizing the antenna pattern peak to unity. Equation (3) and equation (4) then gives equation (5).

$$G(\theta,\varphi\mid\forall s)=\frac{1}{K_D}\cdot E\left[\left|\sum_{n=1}^{N}\sqrt{g_n(\theta,\varphi\mid s_n)}\cdot s_n\left(t-\frac{R}{c_0}+\tau_n(\theta,\varphi)-\tau_n(\theta_s,\varphi_s)\right)\right|^2\right]\tag{5}$$

Expansion of the squared absolute value in equation (5) gives equation (6).

$$G(\theta,\varphi\mid\forall s)=\frac{1}{K_D}\cdot \mathrm{E}\left[\sum_{n=1}^{N}\sqrt{g_n(\theta,\varphi\mid s_n)}\cdot s_n\left(t-\frac{R}{c_0}+\tau_n(\theta,\varphi)-\tau_n(\theta_s,\varphi_s)\right)\cdot \sum_{m=1}^{N}\sqrt{g_m^*(\theta,\varphi\mid s_m)}\cdot s_m^*\left(t-\frac{R}{c_0}+\tau_m(\theta,\varphi)-\tau_m(\theta_s,\varphi_s)\right)\right] \tag{6}$$

Basic knowledge, regarding stationary stochastic processes, gives:

$$E[c\cdot Y]=c\cdot E[Y]$$

$$E[X+Y]=E[X]+E[Y]$$

c is a constant and X and Y are two stationary stochastic processes. With the aid of these two basic roles equation (6) can be transformed into equation (7):

$$G(\theta,\varphi\mid\forall s)=\frac{1}{K_D}\cdot\sum_{n=1}^{N}\sum_{m=1}^{N}\sqrt{g_n(\theta,\varphi\mid s_n)}\cdot\sqrt{g_m^*(\theta,\varphi\mid s_m)}\cdot \mathrm{E}\left[s_n\left(t-\frac{R}{c_0}+\tau_n(\theta,\varphi)-\tau_n(\theta_s,\varphi_s)\right)\cdot s_m^*\left(t-\frac{R}{c_0}+\tau_m(\theta,\varphi)-\tau_m(\theta_s,\varphi_s)\right)\right] \tag{7}$$

Introduce the substitutions:

$$T_n=t-\frac{R}{c_0}+\tau_n(\theta,\varphi)-\tau_n(\theta_s,\varphi_s)\text{ and }T_m=t-\frac{R}{c_0}+\tau_m(\theta,\varphi)-\tau_m(\theta_s,\varphi_s).$$

Note that $T_m-T_n=\tau_m(\theta,\phi)-\tau_m(\theta_s,\phi_s)-\tau_n(\theta,\phi)+\tau_n(\theta_s,\phi_s)$. The expected value in equation (7) is recognized as the cross correlation function $r_{n,m}$ between the waveform $s_n$ and waveform $s_m$. Equation (7) can consequently be reformulated as equation (8).

$$G(\theta,\varphi\mid\forall s)=\frac{1}{K_D}\cdot\sum_{n=1}^{N}\sum_{m=1}^{N}\sqrt{g_n(\theta,\varphi\mid s_n)}\cdot\sqrt{g_m^*(\theta,\varphi\mid s_m)}\cdot r_{n,m}(\tau_m(\theta,\varphi)-\tau_m(\theta_s,\varphi_s)-\tau_n(\theta,\varphi)+\tau_n(\theta_s,\varphi_s)\mid\forall s) \tag{8}$$

Equation (8) can be used to describe a wideband antenna pattern.

This definition of the wideband antenna pattern is a function of the cross correlation functions $r_{n,m}$ between the waveform $s_n$ and waveform $s_m$ and their auto correlation functions for the case with n=m. Grating lobes occur when identical waveforms with a repetitive auto correlation function is used. Sinus shaped waveform is an example of a waveform with repetitive auto correlation function, that consequently should be avoided.

An instantaneous wideband waveform has at every moment a wide bandwidth. This is in contrast to e.g. a stepped frequency waveform that can be made to cover a wide bandwidth by switching to different narrow frequency bands. An instantaneous narrow band waveform having a narrow band instantaneous bandwidth B is defined as $B\cdot L<<c_0$, where L is the longest dimension of the antenna, in this case the wideband array antenna and $c_0$ is the speed of light. Waveforms and bandwidths not being instantaneous narrow band according to this definition are considered to be instantaneous wideband waveforms or instantaneous wideband bandwidths. This definition of an instantaneous wideband waveform or an instantaneous wideband bandwidth is used in this description. An advantage of the invention thus being the possibility to operate with an instantaneously wideband waveform. An instantaneously wideband waveform is a waveform occupying a wide bandwidth.

The wideband array antenna and the antenna system being parts of the invention can be operated with any type of waveforms being an instantaneous wideband or narrow band waveform within an instantaneous narrowband or wideband bandwidth except for the embodiment including the “array thin out” feature which has to be operated with an instantaneously wideband waveform. This “array thin out” embodiment will be described further in detail below. The waveforms can be continuous or pulsed as will be explained under a separate heading below.

When dividing an antenna aperture in sub arrays each sub array must be small enough to fulfil the inequality $B\cdot L_{sub}<<c_0$, where the longest dimension of the sub array is $L_{sub}$.

As mentioned earlier embodiments of the invention provide a wideband array antenna unit and corresponding method by being able to an extended control of the antenna pattern over the instantaneous bandwidth B by controlling characteristics such as the shape, width and direction of one or several main lobe/s and the side lobe level in different directions as well as being able to create a number of wideband cancellation directions in the antenna pattern. The invention will now be described with two examples showing how wideband cancellation directions and frequency independent position and width of a main lobe in the antenna pattern can be achieved. The means for providing the extended control of the antenna pattern comprises the transforming means using one or several parameters calculated from the weighting function $W(\omega)$ at discrete angular frequencies $\omega_q$. The wideband antenna pattern can be defined according to equation (8) above, but other definitions are possible within the scope of the invention.

Wideband Cancellation Directions.

The method for creating the extended control of the antenna pattern of the antenna system or the wideband array antenna included in the wideband array antenna unit comprising wideband cancellation directions shall now be described with an example.

The method will be explained with a wideband array antenna comprising a 2.0 m long linear array antenna consisting of 64 antenna elements fed with white bandwidth limited noise in the frequency range from 6.0 GHz to 18.0 GHz. The intension is to scan one main lobe to 30° and create three wideband cancellation directions, at 20°, 40° and 50°. Following designations are used:

| Assumed values | | |
|---|---|---|
| L | (L = 2.0 m) | Antenna length |
| N | (N = 64) | Number of antenna elements |
| $f_c$ | ($f_c$ = 12 GHz) | Centre frequency in Hz |
| $f_{min}$ | ($f_{min}$ = 6.0 GHz) | Minimum frequency |
| $f_{max}$ | ($f_{max}$ = 18.0 GHz) | Maximum frequency |
| $\theta_{max}$ | ($\theta_{max}$ = 30.0°) | Main lobe direction |
| $\theta_{min}$ | ($\theta_{min}$ = [20.0°, 40.0°, 50.0°]) | Cancellation directions |

-continued

| | | |
|---|---|---|
| B | (B = 12 GHz) | Bandwidth in Hz |
| $\tau_p$ | ($\tau_p$ = 1 ns) | Pulse length in s |
| | Variabels | |
| f | | Frequency in Hz |
| n | | Antenna element number |
| | Physical constant | |
| $c_0$ | | speed of light ≈ $2.997925 \cdot 10^8$ m/s |

Commence by placing (N−1) evenly distributed zero points (z) on the unit circle according to below references and according to equation (9). The reason for this simple choice of tapering, i.e. an even distribution of zero points, is to simplify the calculations. The choice of tapering does not affect the conclusions as tapering mainly affects the side lobe level and not the positioning of the wideband cancellation directions.

$$z_n = e^{j\cdot(n+1)\cdot\frac{2\pi}{N}} \quad n \in 0 \ldots (N-2) \tag{9}$$

Schelkunoff's unit circle is well known to the skilled person and can be further studied in following books:

S. A. Schelkunoff, "A Mathematical Theory of Linear Arrays", Bell System Tech. J., 22 (1943), 80 107.

W. L. Weeks, "Antenna Engineering", McGraw-Hill Electronic Science Series, 1968.

Robert S. Elliott, "Antenna Theory and design", Prentice-Hall Inc., 1981 Samuel Silver, "Microwave Antenna Theory and Design" McGraw-Hill Book Company Inc., 1949.

Calculate "the angles" ($\Psi_{max}$, $\Psi_{min}$) corresponding to the main lobe and the zero points, on the unit circle according to equation (10) and equation (11). The zero points are positioned at each side of the main lobe.

$$\psi_{max}(f) = \frac{2\cdot\pi\cdot f}{c_0}\cdot\frac{L}{N-1}\cdot\sin(\theta_{max}) \tag{10}$$

$$\psi_{min}(f) = \frac{2\cdot\pi\cdot f}{c_0}\cdot\frac{L}{N-1}\cdot\sin(\theta_{min}) \tag{11}$$

Note that "the angles" ($\Psi_{max}$, $\Psi_{min}$) are frequency dependent. Rotate all zero points (z) to new positions ($z_{rot}(f)$) according to equation (12) to steer the main lobe to the correct direction.

$$z_{rot\,n}(f) = z_n \cdot e^{j\cdot\Psi_{max}(f)} \tag{12}$$

The distance ($d_n(f)$) between these new zero points and the ones required to create desired cancellation directions in the antenna pattern can be calculated with equation (13).

$$d_n(f) = |z_{rot\,n}(f) - e^{j\cdot\Psi_{min}(f)}| \tag{13}$$

Observe that the distances ($d_n(f)$) are frequency dependent. Move the zero points in the set [$z_{rot\,n}$] minimizing the distance ($d_n(f)$) to a position corresponding to $e^{j\cdot\Psi_{min}(f)}$ for each frequency and each cancellation direction required in the antenna pattern. The resulting set of zeros, which all are frequency dependent, is represented by the set [$z_{final\ n}(f)$] where n assumes values from 0 to N−2 thus making a total of N−1 zero points. Now the array factor (AF(θ,f)) can be formulated on it's product form according to equation (14).

$$AF(\theta, f) = \frac{\prod_{n=0}^{N-2}\left(e^{j\cdot\left(\frac{2\cdot\pi\cdot f}{c_0}\cdot\frac{L}{N-1}\cdot\sin(\theta)\right)} - z_{final\ n}(f)\right)}{\prod_{n=0}^{N-2}\left(e^{j\cdot\left(\frac{2\cdot\pi\cdot f}{c_0}\cdot\frac{L}{N-1}\cdot\sin(\theta_{max})\right)} - z_{final\ n}(f)\right)} \tag{14}$$

By formulating and solving a system of equations with the excitation of each antenna element ($E_n(f)$) as the unknown, the array excitation will be calculated. Now the array factor (AF(θ,f)) can be formulated on it's summa form according to equation (15).

$$AF(\theta, f) = \sum_{n=1}^{N} E_n(f)\cdot e^{j\cdot(n-1)\cdot\left(\frac{2\cdot\pi\cdot f}{c_0}\cdot\frac{L}{N-1}\cdot\sin(\theta)\right)} \tag{15}$$

Figure 5:
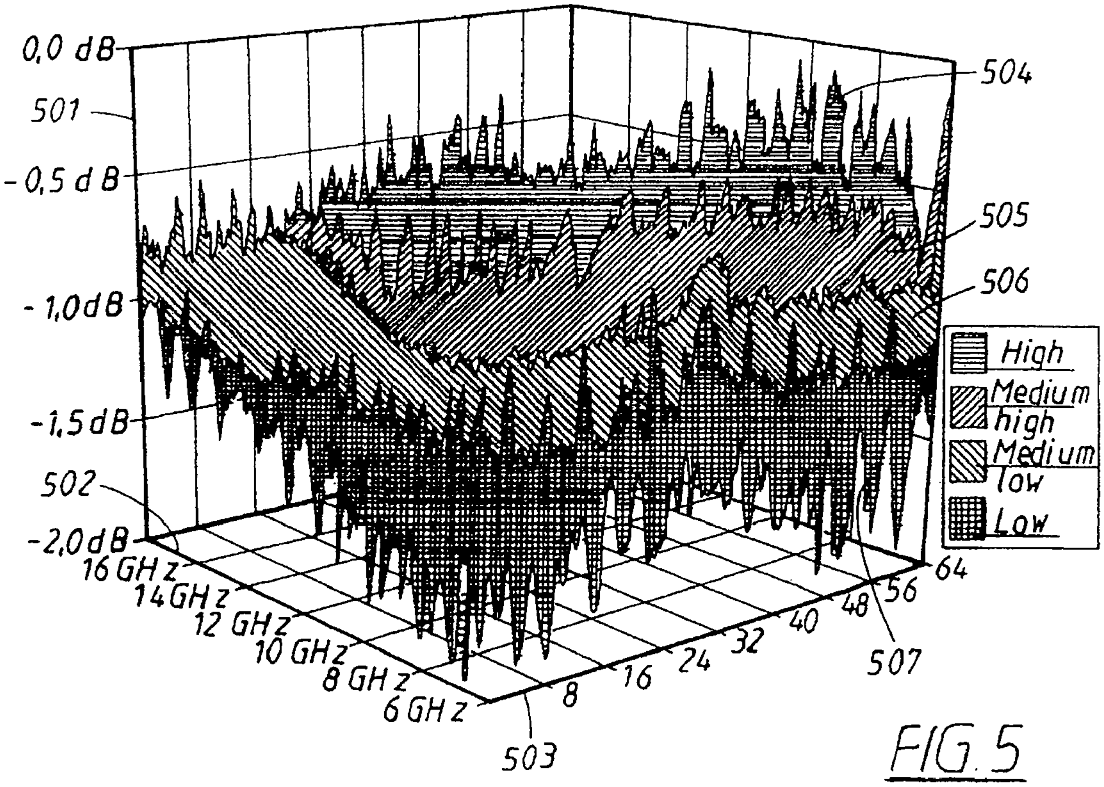
FIG. 5 schematically shows power as a function of antenna element number and frequency.

The array factor describes the gain of the antenna array structure assuming that each antenna element is an isotropic radiator. The element excitations ($E_n(f)$) describes both the amplitude and phase dependency on frequency in each antenna element n. The phases could thereafter be transformed to frequency dependent time delays $\tau_{n,q}=\phi_{n,q}/2\cdot\pi\cdot f_q$. Ambiguities arising in the transformation are resolved by selecting the time delay closest to the time delay corresponding to the time delay giving the main lobe direction in each element for each frequency. FIG. 5 (power) and FIG. 6 (time delay) illustrates the result.

FIG. 5 is a three dimensional representation of the power $|A_n(\omega_q)|^2$ as a function of spectral component q and antenna element n for the array antenna in transmit mode. Power is shown on a vertical axis 501 in dB, 0 dB corresponding to no attenuation. Axis 502 shows frequency between 6-18 GHz and axis 503 represents the antenna element number. In this example 64 antenna elements are used. Area 504 represents high power, area 505 medium-high, area 506 medium-low, and area 507 low power. The power variations in this example are relatively small, within about 2 dB. FIG. 6*a* is a three dimensional representation of the frequency dependent time delays as a function of frequency and antenna element in the array antenna. The time delays are shown on a vertical axis 601 in seconds. Axis 602 shows frequency between 6-18 GHz and axis 603 represents the antenna element number. In this example the main lobe direction is designed to be 30°. This is illustrated in FIG. 6*b* showing the array antenna 604 with the end antenna elements 605 and 606. An incident plane wave front 609 then must have a time delay at antenna element 606 corresponding to the time it takes for the wave to travel the distance 608 to reach antenna element 605. With a length of the antenna array of 2 m and the main lobe direction 607 being 30° the distance 608 becomes 1 m and the time for light to travel this distance is about 3.3 ns. Thus the time delay at element 606 should be 3.3 ns and the time delay at antenna element 605 shall be zero for the waveforms at each element to be in phase. The time delay then varies linearly between 0 to 3.3 ns along the array antenna as is shown in FIG. 6*a*. The time delay seems to be constant with frequency, however as will be shown in FIG. 7 there are some small time delay variations as a function of frequency.

As can be seen in FIG. 5 and FIG. 6 the deviation in both power and time delays relative to the time delays corresponding to the time delays giving the main lobe direction are small. In FIGS. 6*a* and 6*b* a maximum time delay of approximately 3.3 ns gives the direction 30° of the main lobe. From FIG. 6*a* it seems as if the time delay as a function of antenna element number and frequency describes a flat plane. There is however small deviations in the time delay from the flat plane which is illustrated in FIG. 7 where the time delay scale has been expanded with a factor of 1000. But these small deviations from the time delays giving the main lobe direction shown in FIG. 7, called "delta time delays", are essential for the creation of the desired cancellation directions. These "delta time delays" are, as described, taken into account in the weighting function W(ω). In this example both power and time delay is controllable as a function of frequency in each element. A hardware realization where the bandwidth is divided in 8 spectral components is illustrated in FIG. 1. An alternative realization in the time domain is described in FIG. 2*a* and FIG. 2*b*.

FIG. 7 is a three dimensional representation of the "delta time delays" as a function of frequency and antenna element. The "delta time delays" are shown on a vertical axis 701 in seconds. Axis 702 shows frequency between 6-18 GHz and axis 703 represents the antenna element number. As can be seen the time delay variations decreases with increasing frequency. Area 704 represents high "delta time delay", area 705 medium-high, area 706 medium-low and area 707 low "delta time delay".

Figure 8:
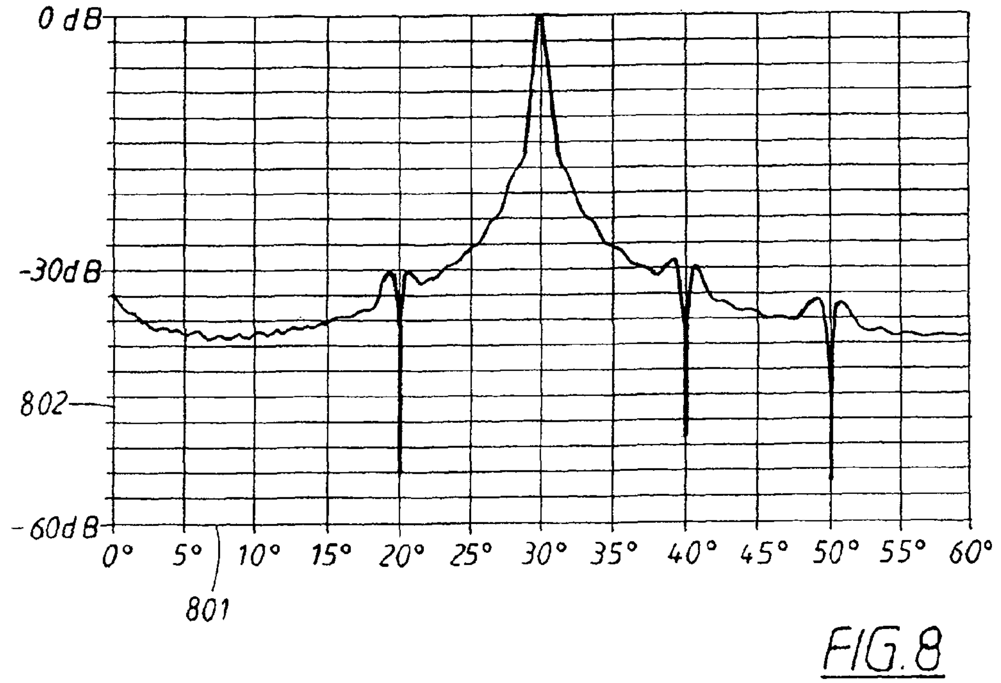
FIG. 8 shows the Array factor with wideband cancellation directions and main lobe resulting from the invention.

The array factor can now be calculated according to the above definition in equation (8). The result is illustrated in FIG. 8 where the direction θ is represented on the horizontal axis 801 and the radiated power/sensitivity on the vertical axis 802. As can be seen the main lobe is at 30° and the cancellation directions at 20°, 40° and 50° as expected. The array factor shown in FIGS. 8-12 and 15-16 is identical to the antenna pattern according to the definition of antenna pattern above assuming omni directional element patterns. The vertical axis thus shows radiated power in transmit mode and sensitivity in the receive mode as a function of direction.

In most hardware realization neither the amplitudes of $E_n(f)$ nor the phases of $E_n(f)$ can be varied continuously as a function of frequency. The instantaneous bandwidth B normally has to be divided in Q spectral components. In practice the frequency division could be done with the aid of an FFT as described in association with FIG. 1. The discrete attenuations/amplifications $a_{n,q}$ (q=spectral component number and n=antenna element number) and the discrete time delays $\tau_{n,q}$, alternatively discrete phase shifts $\phi_{n,q}$, are selected as the amplitude and time delay, alternatively phase shifts, at the centre frequency of each spectral component. This could be written as $a_{n,q}=|E_n(f_q)|$ and $\tau_{n,q}=\arctan\{\mathrm{Im}[E_n(f_q)]/\mathrm{Re}[E_n(f_q)]\}/(2\cdot\pi\cdot f_q)$, alternatively phase shifts $\phi_{n,q}=\arctan\{\mathrm{Im}[E_n(f_q)]/\mathrm{Re}[E_n(f_q)]\}$, where $f_q$ represents the centre frequency of each spectral component q ($q \in 0 \ldots (Q-1)$). Im represents the imaginary part and Re the real part of the expression. The array factor can now be calculated as an average based on either the centre frequencies in each spectral component, see equation (16), or based on the frequencies joining adjacent spectral components, see equation (17).

$$AF_{centre}(\theta)=\frac{\sqrt{\sum_{q=0}^{Q-1}\left|\sum_{n=1}^{N}\left(|a_{n,q}|\cdot e^{j\cdot 2\cdot\pi\cdot f_q\cdot\tau_{n\cdot q}}\cdot e^{j\cdot(n-1)\cdot\left(\frac{2\cdot\pi\cdot f_q}{c_0}\cdot\frac{L}{N-1}\cdot\sin(\theta)\right)}\right)\right|^2}}{\sqrt{\sum_{q=0}^{Q-1}\left|\sum_{n=1}^{N}\left(|a_{n,q}|\cdot e^{j\cdot 2\cdot\pi\cdot f_q\cdot\tau_{n\cdot q}}\cdot e^{j\cdot(n-1)\cdot\left(\frac{2\cdot\pi\cdot f_q}{c_0}\cdot\frac{L}{N-1}\cdot\sin(\theta_{max})\right)}\right)\right|^2}} \tag{16}$$

-continued $$AF_{joint}(\theta)=\frac{\sqrt{\sum_{q=0}^{Q-2}\left|\sum_{n=1}^{N}\left(\begin{array}{c}|a_{n,q}|\cdot e^{j\cdot 2\cdot\pi\cdot\frac{f_q+f_{q+1}}{2}\cdot\tau_{n\cdot q}}\cdot\\ e^{j\cdot(n-1)\cdot\left(\frac{2\cdot\pi\cdot\frac{f_q+f_{q+1}}{2}}{c_0}\cdot\frac{L}{N-1}\cdot\sin(\theta)\right)}\end{array}\right)\right|^2}}{\sqrt{\sum_{q=0}^{Q-1}\left|\sum_{n=1}^{N}\left(\begin{array}{c}|a_{n,q}|\cdot e^{j\cdot 2\cdot\pi\cdot f_q\cdot\tau_{n\cdot q}}\cdot\\ e^{j\cdot(n-1)\cdot\left(\frac{2\cdot\pi\cdot f_q}{c_0}\cdot\frac{L}{N-1}\cdot\sin(\theta_{max})\right)}\end{array}\right)\right|^2}} \tag{17}$$

The correct array factor ought to be between $AF_{centre}$ and $AF_{joint}$. $AF_{joint}$ is assumed to give the lower performance of the two array factors both for cancellation directions and the main lobe.

In FIGS. 9-12 $AF_{joint}$ is plotted with expanded angle scale around cancellation directions and the main lobe for different numbers of spectral components in the FFT calculations. The graphs thus illustrate the lower performance limit for each case for the array antenna used as an example of a wideband array antenna or antenna system when describing the method for creating the wideband cancellation directions.

Figure 9:
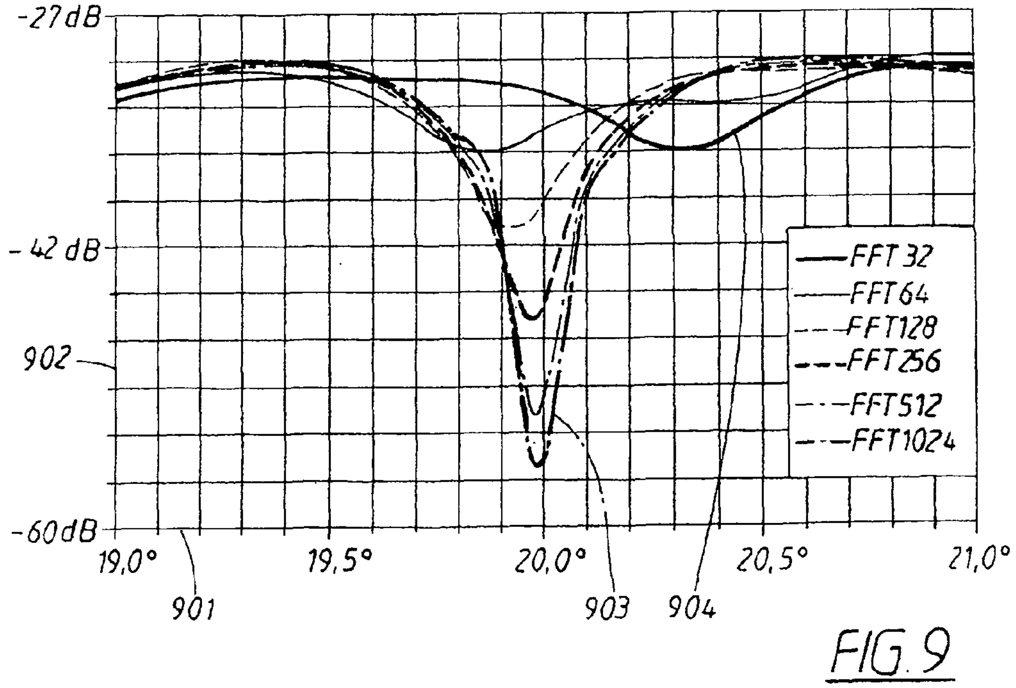
FIG. 9 shows antenna patterns of a wideband cancellation direction at 20° for different FFT length.

FIG. 9 shows angle θ on the horizontal axis 901 and the radiated power on the vertical axis 902. The cancellation direction at 20° becomes sharper for increasing length of the FFT. Curve 904 shows the radiation power/sensitivity with a 32-point FFT and curve 903 with 1024 points.

Figure 10:
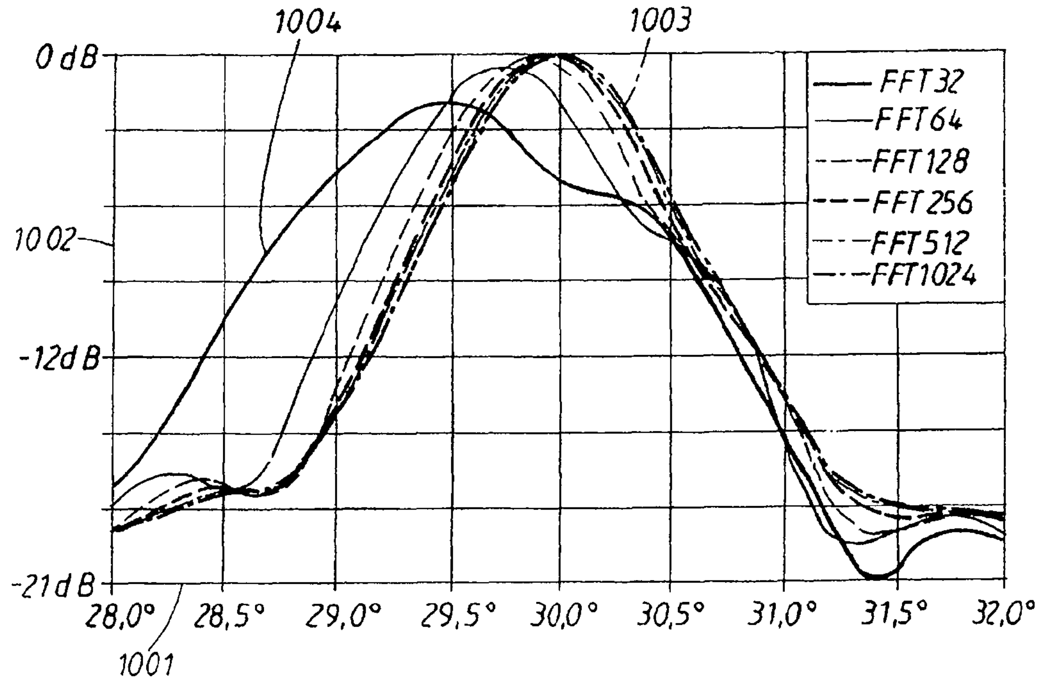
FIG. 10 shows antenna patterns of a main lobe at 30° for different FFT length.

FIG. 10 shows angle θ on the horizontal axis 1001 and the radiated power/sensitivity on the vertical axis 1002. The maximum radiation/sensitivity direction at 30° becomes sharper for increasing FFT length. Curve 1004 shows the radiation power/sensitivity with a 32-point FFT and curve 1003 with 1024 points.

Figure 11:
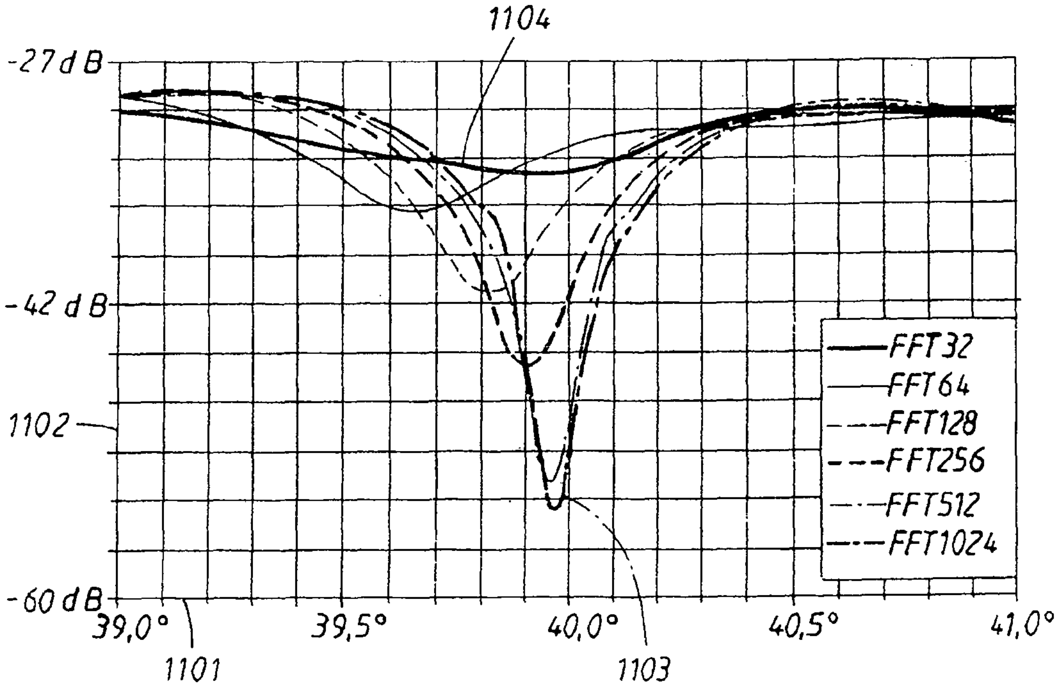
FIG. 11 shows antenna patterns of a wideband cancellation direction at 40° for different FFT length.

FIG. 11 shows angle θ on the horizontal axis 1101 and the radiated power/sensitivity on the vertical axis 1102. The cancellation direction at 40° becomes sharper for increasing FFT length. Curve 1104 shows the radiation power/sensitivity with a 32-point FFT and curve 1103 with 1024 points.

Figure 12:
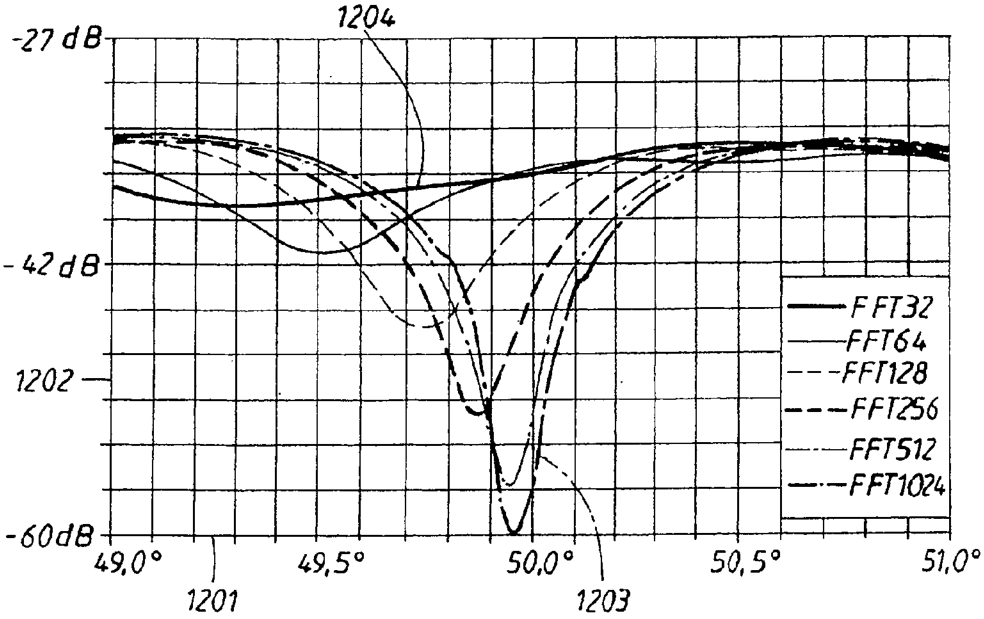
FIG. 12 shows antenna patterns of a wideband cancellation direction at 50° for different FFT length.

FIG. 12 shows angle θ on the horizontal axis 1201 and the radiated power/sensitivity on the vertical axis 1202. The cancellation direction at 50° becomes sharper for increasing FFT length. Curve 1204 shows the radiation power/sensitivity with a 32-point FFT and curve 1203 with 1024 points.

Frequency Independent Position and Width of the Main Lobe

The possibilities of the extended control of the antenna pattern of the wideband array antenna included in the wideband array antenna unit or the antenna system will now be described with a further example showing how the invention can be used to achieve a frequency independent position and fixed width of one main lobe.

Assume the same conditions with the 2 m long array antenna used as an example of a wideband array antenna or antenna system when describing the method for creating the wideband cancellation directions above. In this case no wideband cancellation directions shall be created except for the wideband cancellation directions on each side of the main lobe controlling the main lobe width. Simplify the example and introduce frequency independence only to the cancellation direction on each side of the main lobe. It is a considerably harder problem to introduce frequency independence of, for example, the 3 dB lobe width. This simplification does not influence the conclusions as the main lobe primarily is depending on the closest minimum. A frequency independent and fixed main lobe width is desirable for minimizing the frequency filtering of the used waveform within the main lobe width in order not to distort the received/transmitted waveform within the main lobe width. Chose the first zero point on each side of the main lobe coinciding with the corresponding zero point at $f_{min}$ when all remaining zero points are evenly distributed on the unit circle, see references mentioned in association with equation (9).

Commence by calculating the angle from the main lobe centre to the first zero point ($\theta_0$). With above conditions this angle could be calculated according to equation (18).

$$\theta_0 = \arcsin\left(\frac{c_0}{L\cdot f_{min}}\cdot\frac{N-1}{N}\right) \tag{18}$$

Continue by calculating the "angles" ($\Psi_{0l}$, $\Psi_{0r}$) corresponding to the first zero point on the left side $\Psi_{0l}$ and the first zero point on the right side $\Psi_{0r}$ of the main lobe on the unit circle with the aid of equation (19) and equation (20) respectively.

$$\psi_{0l}(f) = \frac{2\cdot\pi\cdot f}{c_0}\cdot\frac{L}{N-1}\cdot\sin(\theta_0) \tag{19}$$

$$\psi_{0r}(f) = 2\cdot\pi - \psi_{0l}(f) \tag{20}$$

Spread all remaining zero points $z_n(f)$ evenly in angle on the unit circle between $\Psi_{0l}$ and $\Psi_{0r}$, according to equation (21). This simple choice of evenly distributed zero points simplifies the calculations to follow without affecting the conclusions.

$$z_n(f) = e^{j\cdot[\psi_{0l}(f)+\frac{n}{N-2}\cdot(\psi_{0r}(f)-\psi_{0l}(f))]} \tag{21}$$

Calculate $\Psi_{max}(f)$ according to equation (10) and rotate all zero points according to equation (22).

$$z_{rot\,n}(f)=z_n(f)\cdot e^{j\cdot\psi_{max}(f)} \tag{22}$$

The array factor (AF(θ,f)) can now be written in product form in analogy with equation (14). By formulating and solving a system of equations with the excitation $E_n(f)$ of each antenna element as the unknown, the array excitation can be calculated. The array factor (AF(θ,f)) can thereafter be formulated on it's summa form according to equation (15).

Figure 13:
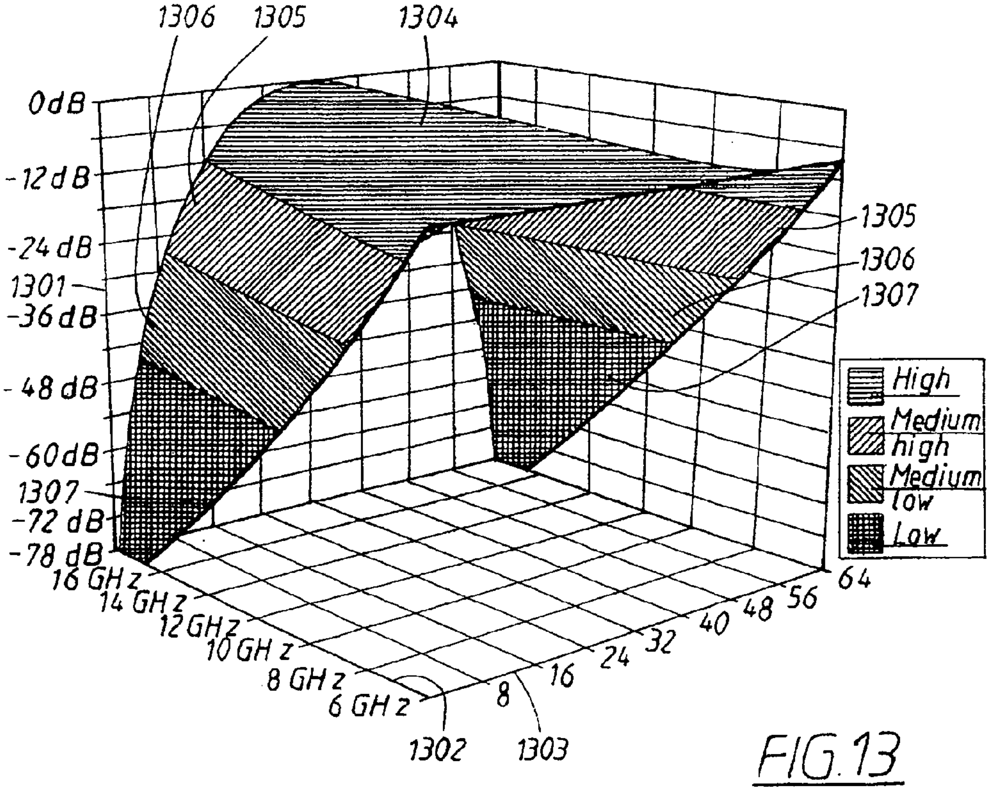
FIG. 13 schematically shows power as a function of element number and frequency with fixed width of one main lobe.

The element excitations $E_n(f)$ describes both the amplitude and phase dependency on frequency in each antenna element as described above. Ambiguities arising in the transformation are resolved by selecting the time delay closest to the time delay corresponding to the time delay giving the main lobe direction in each antenna element for each frequency. The result is illustrated in FIG. 13 (power) and FIG. 14 (time delay). The graphs reveal considerable variations in power, in contradiction to the situation when calculating the cancellation directions, and time delays according to FIG. 14 only marginally diverging from the time delays corresponding to the time delays giving the main lobe direction as shown in FIG. 6*a*. This fact lead to the conclusion that two frequency dependent parameters, attenuation/amplification and time delay or phase shift, ought to be adjustable as a function of frequency in each antenna element when both wideband cancellation directions and frequency independent width of the main lobe shall be controlled. When only control of the width of the main lobe over a wide frequency band is required it can be sufficient just to use attenuation/amplification i.e. to use only one frequency dependent parameter in conjunction with frequency independent time delay to control the main lobe direction. However if only wideband cancellation directions and/or frequency independent direction of the main lobe is required it can be sufficient just to use time delays i.e. to use only one frequency dependent parameter. An example of realization with 8 spectral components is illustrated in FIG. 1.

FIG. 13 is a three dimensional representation of radiated power/sensitivity as a function of frequency and antenna element for the array antenna used as an example of a wideband array antenna or antenna system when explaining how to achieve frequency independent position and fixed width of one main lobe. The radiated power/sensitivity is shown on a vertical axis 1301 in dB. Axis 1302 shows frequency between 6-18 GHz and axis 1303 represents the antenna element number. Area 1304 represents high power, area 1305 medium-high, area 1306 medium-low and area 1307 low power. As shown in FIG. 13 the above choice of angles for the first zero point on each side of the main lobe results in a "square" aperture distribution at $f_{min}$. For increasing frequencies a successively smaller and smaller part of the aperture will be used, leading to very low power/sensitivity levels at $f_{max}$ for the edge elements. As shown the power/sensitivity variations are substantial from 0 to 78 dB.

Figure 14:
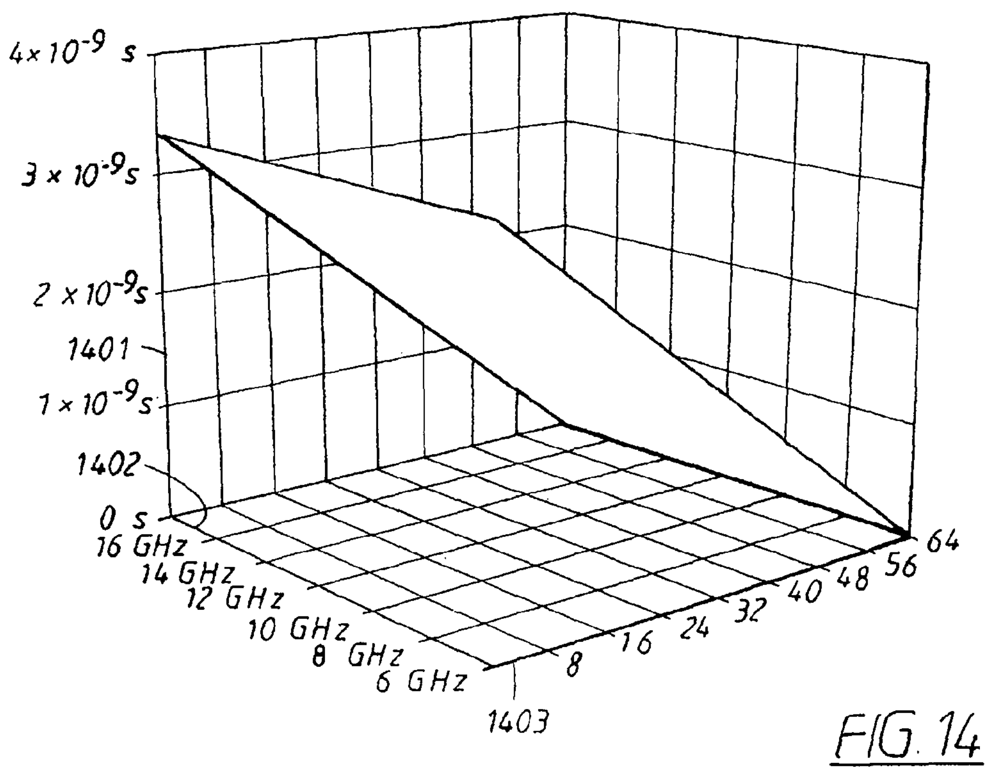
FIG. 14 schematically shows time delays as a function of element number and frequency with fixed width of one main lobe.

FIG. 14 is a three dimensional representation of the frequency dependent time delays as a function of frequency and antenna element for the array antenna used as an example of a wideband array antenna or antenna system when explaining how to achieve frequency independent position and fixed width of one main lobe. The time delays are shown on a vertical axis 1401 in seconds. Axis 1402 shows frequency between 6-18 GHz and axis 1403 represents the antenna element number.

Figure 15:
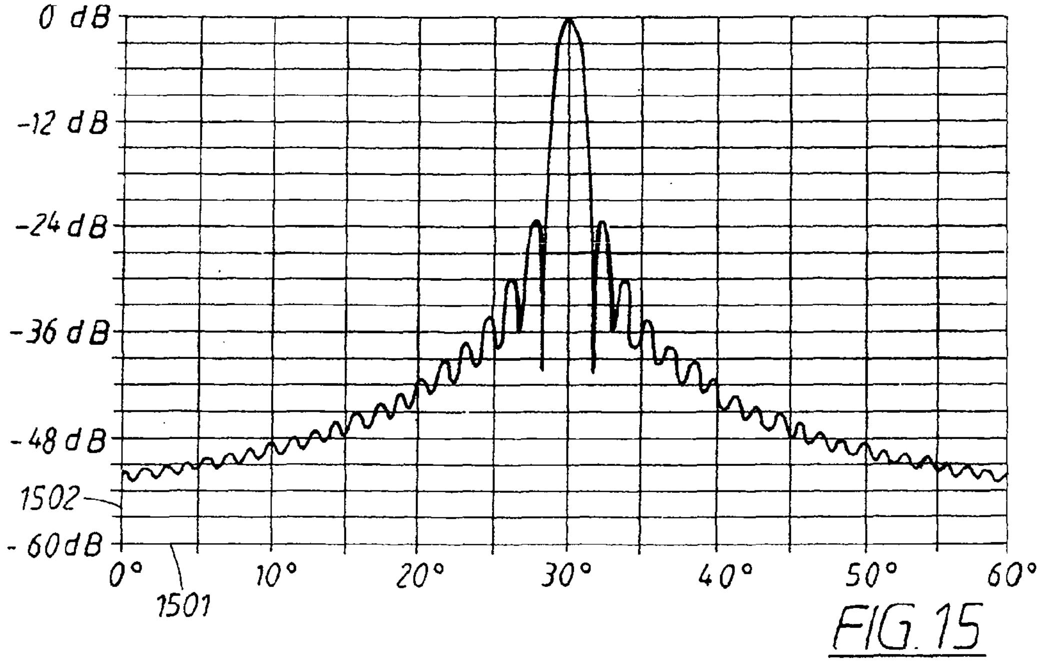
FIG. 15 shows the Array factor with frequency independent position and fixed width of one main lobe resulting from the invention.

The array factor can now be calculated according to equation (8) for the array antenna used as an example of a wideband array antenna or antenna system when explaining how to achieve frequency independent position and fixed width of one main lobe. The result is illustrated in FIG. 15 where the direction θ is represented on the horizontal axis 1501 and the radiated power/sensitivity on the vertical axis 1502. As can be seen the main lobe is at 30°.

Figure 16:
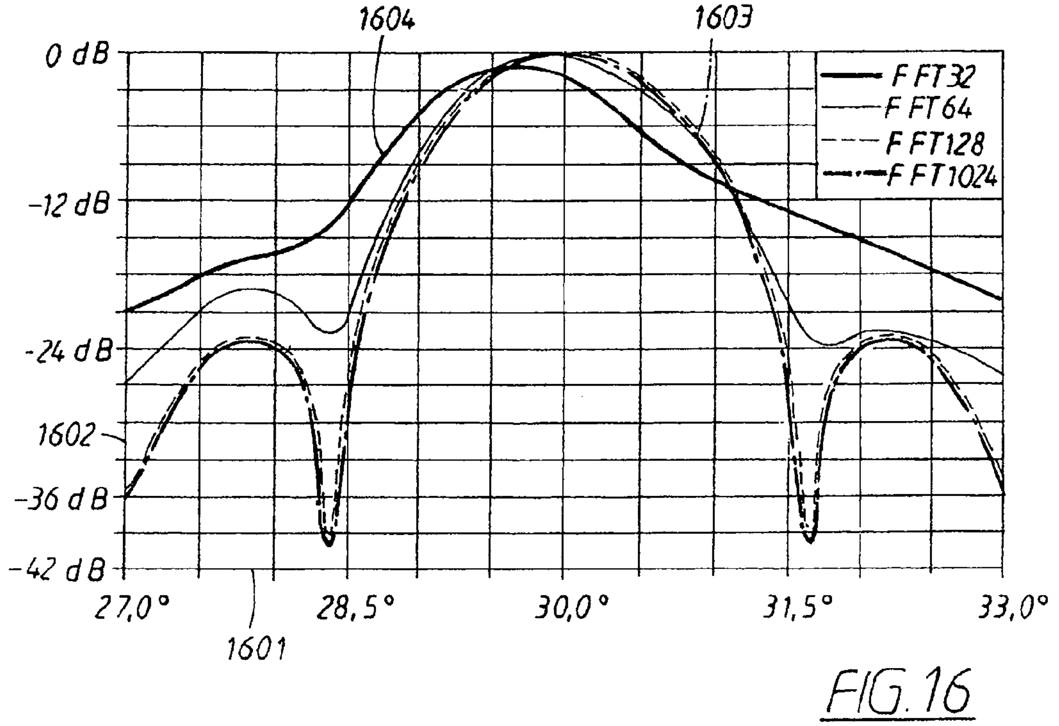
FIG. 16 shows antenna patterns of one main lobe at 30° with adjacent wideband cancellation directions for different FFT length.

As mentioned, when calculating the array factor in association with creating the cancellation directions, neither the amplitudes $|E_n(f_q)|$ nor the time delays $\arctan\{\mathrm{Im}[E_n(f_q)]/\mathrm{Re}[E_n(f_q)]\}/(2\cdot\pi\cdot f_q)$, alternatively phase shifts $\arctan\{\mathrm{Im}[E_n(f_q)]/\mathrm{Re}[E_n(f_q)]\}$, can be varied continuously as a function of frequency in a practical hardware realization. Therefore the bandwidth in question must be divided in spectral components in the same way as described when calculating the array factor in association with creating the wideband cancellation directions. $AF_{centre}$ and $AF_{joint}$ can thereafter be calculated according to equation (16) and (17) respectively. Also in analogy with the calculations of the wideband cancellation directions described above a lower performance is expected for $AF_{joint}$. FIG. 16 is an illustration of $AF_{joint}$ for the array antenna used as an example of a wideband array antenna or antenna system when explaining how to achieve frequency independent position and fixed width of one main lobe with expanded angle scale around the main lobe for different numbers of spectral components in the FFT calculation. FIG. 16 shows angle θ on the horizontal axis 1601 and the radiated power/sensitivity on the vertical axis 1602. The maximum radiation/sensitivity direction at 30° becomes sharper for increasing FFT length. Curve 1604 shows the radiation power/sensitivity with a 32-point FFT and curve 1603 with 1024 points.

Conclusions from the above described examples "Wideband cancellation directions" and "Frequency independent position and width of the main lobe" are as follows:

A frequency independent main lobe width can be created.

A frequency dependent "true time delay" or phase shift is desired to be able to combine frequency independent main lobe with wideband cancellation directions.

A frequency dependent attenuation is advantageous to accomplish a fixed main lobe width over the frequency bandwidth B.

A relatively large FFT is required for each antenna element. A minimum FFT length of 128 points is required to maintain the shape of the main lobe reasonably fixed in the examples above, operating in the very wide frequency range from 6 GHz to 18 GHz. However in many applications having a narrower bandwidth than in this example it is sufficient with a shorter, or much shorter, FFT length.

Pulsed Waveforms

The examples described above have been based on continuous waveforms. The invention can however also be used for pulsed waveforms which will be explained by the following example. Assume the same conditions and use the weighting coefficients calculated in the above example with the 2 m long array antenna as an example of a wideband array antenna or antenna system describing the method for creating the cancellation direction. The Fourier transform $U_{in}(\omega)$ of a bandwidth limited pulse can be written according to equation (23).

$$U_{in}(\omega) = \begin{cases} 2 \cdot \dfrac{\sin\left[(\omega - \omega_c) \cdot \dfrac{T}{2}\right]}{\omega - \omega_c} & \omega_c - \pi \cdot B \le \omega \le \omega_c + \pi \cdot B \\ 0 & \omega_c + \pi \cdot B < \omega < \omega_c - \pi \cdot B \end{cases} \quad (23)$$

$\omega_c$=Angular frequency of the carrier in the bandwidth limited pulse equal to the angular frequency with peak amplitude in the spectral domain.

The Fourier transform of the waveform to each antenna element ($U_{elm}(\omega,n)$) is given by equation (24).

$$U_{elm}(\omega,n) = U_{in}(\omega) \cdot A_n(\omega) \cdot e^{-j \cdot \omega \cdot \tau_n(\omega)} \quad (24)$$

Finally the Fourier transform of the resulting waveform can be written according to equation (25).

$$U_{out}(\omega, \theta) = \frac{\sum_{n=0}^{N-1} \left[ U_{elm}(\omega, n) \cdot e^{j \cdot \frac{\omega}{c_0} \cdot d \cdot \left[n - \left(\frac{N-1}{2}\right)\right] \cdot \sin(\theta)} \right]}{N} \quad (25)$$

The inverse transform according to equation (26) gives the waveform as a function of time (t) and azimuth angle (θ).

$$u_{out}(t, \theta) = \int_{f_c - \frac{B}{2}}^{f_c + \frac{B}{2}} U_{out}(2 \cdot \pi \cdot f, \theta) \cdot e^{j \cdot 2 \cdot \pi \cdot f \cdot t} \cdot df \quad (26)$$

Figure 17:
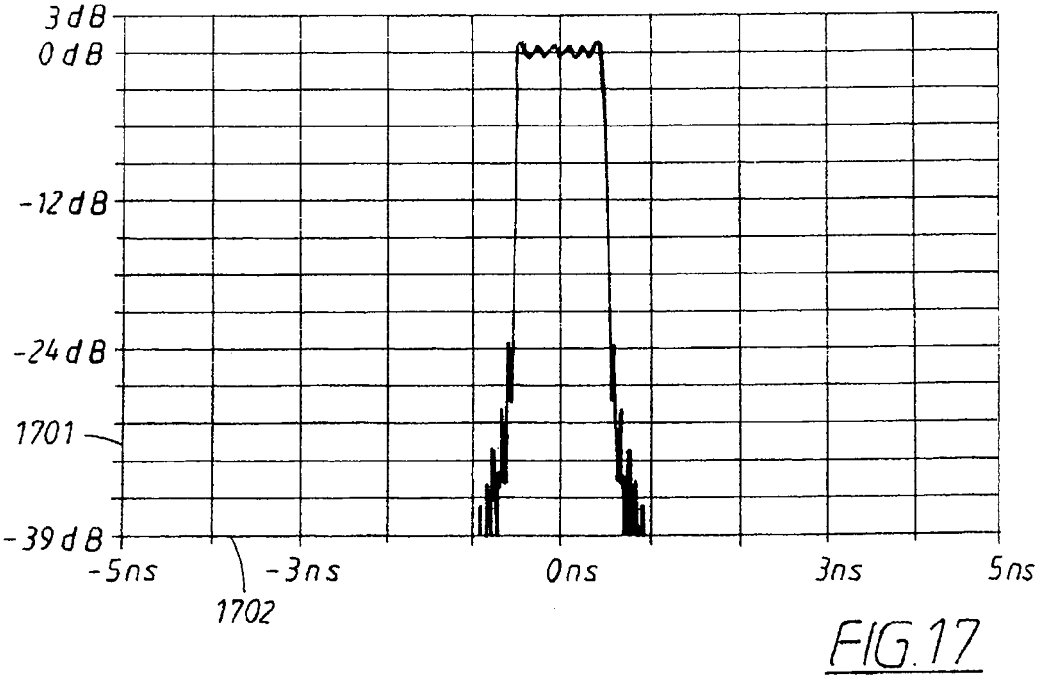
FIG. 17 shows an example of a pulsed waveform.

A bandwidth limited pulse (6 GHz-18 GHz) with the duration $\tau_p$=1 ns is chosen as an example to illustrate that the invention also is applicable to pulses. The envelope as a function of time is illustrated in FIG. 17. FIG. 17 shows the pulse power on the vertical axis 1701 and the pulse duration in ns on the horizontal axis 1702.

Figure 18:
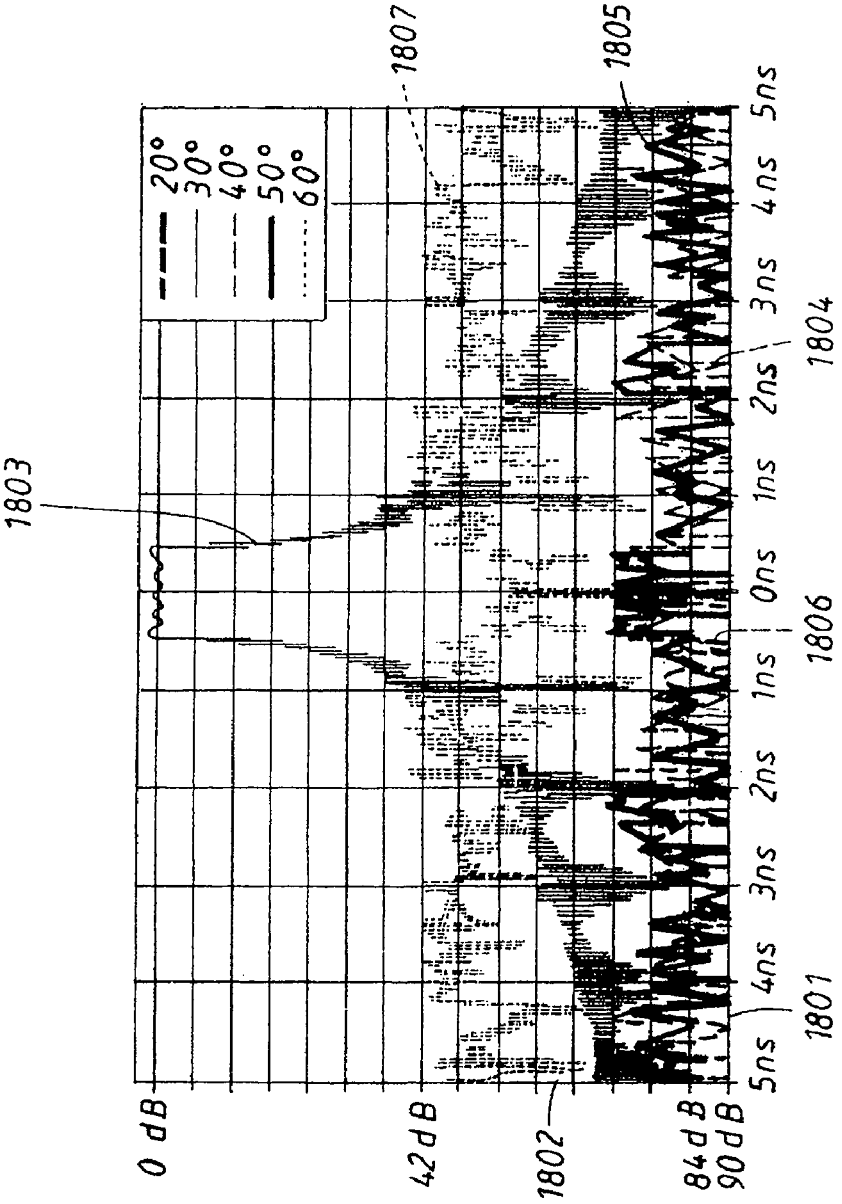
FIG. 18 shows a resulting waveform for a pulsed waveform as a function of time at a number of angles.

The Fourier transform can be calculated with the aid of equation (23). Use equation (25) with N=64 to calculate the Fourier transform of the resulting waveform as a function of angle and frequency. The inverse Fourier transform according to equation (26) is used to calculate the waveform as a function of angle and time. The result is illustrated in FIG. 18. According to the reciprocity theorem the result can either be interpreted as if the test waveform is connected to the antenna port and the radiated resulting waveform is measured for all angles as a function of time or as if the resulting waveform is transmitted from all angles and the chosen test waveform is received and measured at the antenna port as a function of time. Independently of interpretation it is clear from FIG. 18 that three cancellation directions exists at 20°, 40° and 50° at all time.

FIG. 18 illustrates the resulting waveform in transmit mode as a function of time on the horizontal axis 1801 and power on the vertical axis 1802 for a number of angles. Curve 1803 shows radiated power at 30°, curve 1804 at 40°, curve 1805 at 50° and curve 1806 at 20°. Curve 1807 shows radiated power at 60°, where neither a main lobe nor a cancellation direction is created.

The following conclusions can be made from the example when a pulsed wave form is used:

Wideband cancellation directions can be created for pulsed waveforms.

Frequency dependent "true time delay" is advantageous.

Frequency dependent attenuation is advantageous.

Flow Chart

Figure 19:
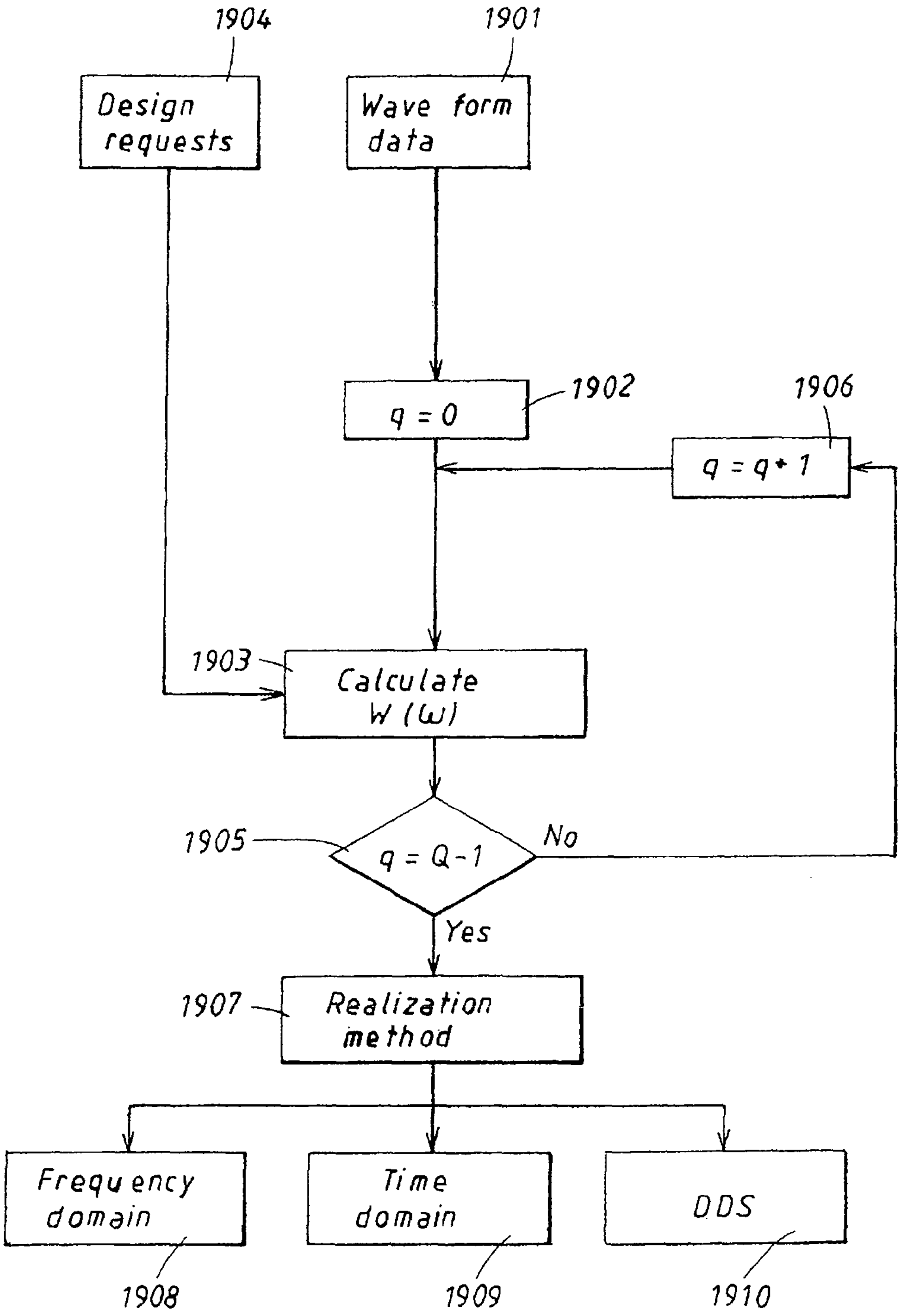
FIG. 19 schematically shows a flow chart for digital realizations of the inventive method.

The method of the digital realization of embodiments of the invention are described in a flow chart shown in FIG. 19 comprising 1901-1910. Waveform data such as centre frequency $f_c$ and instantaneous bandwidth B is specified in 1901. In 1902, the running integer q, representing the number of a spectral component, is set at 0. In 1903, the weighting function $W(\omega)=A(\omega)\cdot e^{-j\cdot\omega\cdot\tau(\omega)}$ or $W(\omega)=A(\omega)\cdot e^{-j\cdot\Phi(\omega)}$ is calculated for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component. The centre frequency $f_q$ of each spectral component is calculated as:

$$f_q = f_c - \frac{B}{2} + \left(q + \frac{1}{2}\right) \cdot \frac{B}{Q}$$

for a case with equividistant spectral component division. The standard methods used for the calculation of the weighting function can be any classical antenna synthesis method such as Schelkunoff's method. The design requests can e.g. comprise:

shape of one or several main lobes direction of one or several main lobes width of one or several main lobes side lobe levels in different directions cancellation directions In the description above the invention is exemplified with how to achieve wideband cancellation directions in combination with wideband direction of one main lobe and how the width and direction of this main lobe can be kept constant over the instantaneous bandwidth B. Other combinations of design request can be used when applying an antenna synthesis method as the Schelkunoff method such as e.g. wideband cancellation directions in combination with fixed width and direction of one or several main lobes over the entire or parts of the instantaneous bandwidth B.

After 1903, has been performed the value of integer q is checked in 1905, and if it is below Q−1 it is increased by 1 in 1906, and the calculations in 1903 is performed for the next spectral component. When the check in 1905 results in q=Q−1 all spectral components have been calculated and a choice of realization method is made in 1907.

If a frequency domain realization 1908 is made, W(ω) is used for antenna element/sub array n and frequency $f_q$ as described in association with FIG. 1*a*.

If a time domain realization 1909 is made, weighting coefficients $w_{n,q}$ are used for antenna element/sub array n for each spectral component q as described in association with FIGS. 2*a* and 2*b*. $w_{n,q}$ is calculated as the Inverse Fourier Transform of W(ω), see equation (2).

If a DDS realization 1910 is made the resulting waveform is digitally calculated for each antenna element/sub array in advance and the result is fed to the DDS unit for each antenna element/sub array. The calculation can be made either in the time domain or in the frequency domain, see equation (2).

The calculations of the parameters from the weighting function $W(\omega)=A(\omega)\cdot e^{-j\cdot\omega\cdot\tau(\omega)}$ or $W(\omega)=A(\omega)\cdot e^{-j\cdot\Phi(\omega)}$ can be performed at any convenient location, e.g. in a calculation unit integrated in the array antenna, the transforming means, the electronic system or a separate calculation unit, and then transferred to the transforming means.

Array Thin Out

The invention also has the added advantage that for a wideband array antenna the number of antenna elements required for instantaneous wideband operation can be reduced. This "array thin out" feature of the invention will now be described. The element separation in an antenna operating with an instantaneously wideband waveform having an instantaneous bandwidth B can be increased to above λ/2 without the appearance of grating lobes, λ being the wavelength corresponding to a maximum frequency within the system bandwidth of e.g. a radar system. The system bandwidth is greater or equal to the instantaneous bandwidth B. This results in a reduced number of antenna elements needed compared to conventional array antenna design using an element separation of half a wavelength.

The antenna element reduction feature or "array thin out" feature for the wideband array antenna will be described with two examples, one for a linear array and one for a circular array.

In the examples to follow a simple antenna element diagram according to equation (27) and identical waveform in all antenna elements is assumed.

$$g(\theta,\varphi)=\begin{cases}\cos^2(\theta) & om\quad \cos(\theta)>0\\ 0 & om\quad \cos(\theta)\le 0\end{cases}\tag{27}$$

For a one dimensional linear array the time delays of the waveform from/to element n can be calculated according to equation (28).

$$\tau_n(\theta)=\frac{n-1}{N-1}\cdot\frac{L}{c_0}\cdot\sin(\theta)\tag{28}$$

L=Antenna length

N=Number of antenna elements

Figure 20:
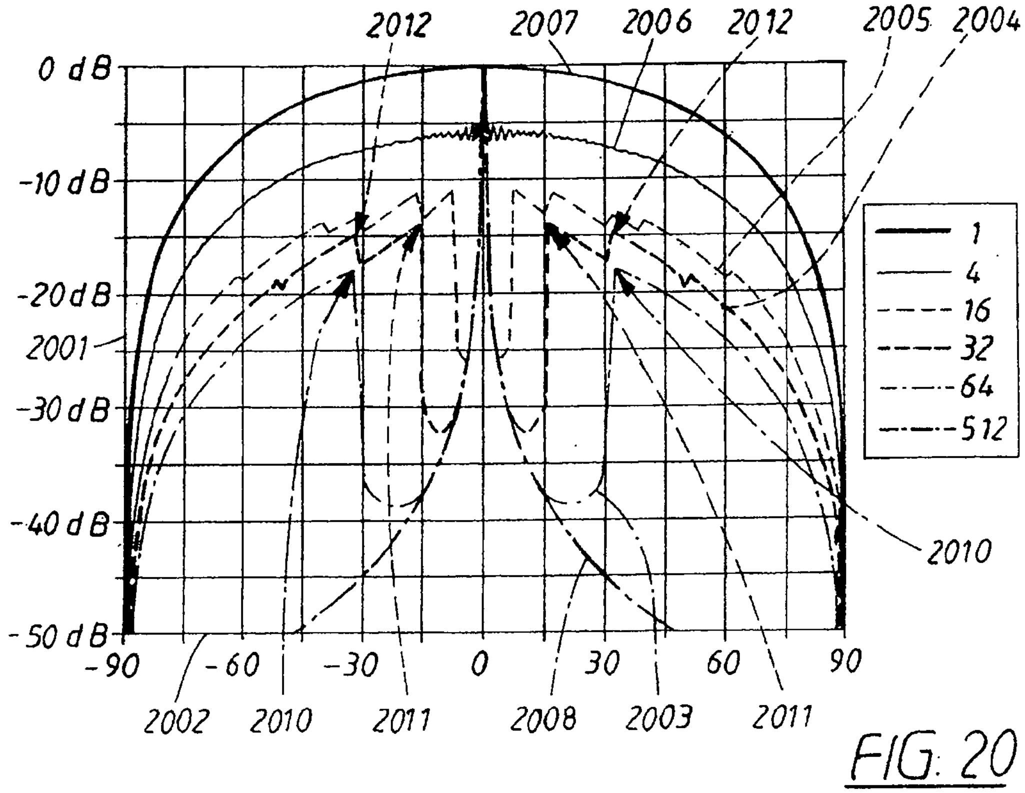
FIG. 20 shows antenna pattern for a linear array.

An example with white bandwidth limited Gaussian noise is shown in FIG. 20, calculated according to equation (8), in the transmit mode. FIG. 20 shows radiated power on the vertical axis 2001 as a function of the angle θ on the horizontal axis 2002. Curve 2003 visualizes the case with 64 elements, the angle for the first grating lobe at maximum frequency is clearly visible at the angles ±31.6° marked with arrows 2010. Curve 2004 visualizes the case with 32 elements, the angles for the two first grating lobes at maximum frequency is clearly visible at the angles ±15.0° marked with arrows 2011 and ±31.1° marked with arrows 2012 respectively. The angles for these narrow band grating lobes are calculated by conventional methods well known to the skilled person. Curve 2005 visualizes the case with 16 elements and several grating lobe angles are clearly visible. With 4 or less than 4 elements, curves 2006 and 2007, illustrates the result. With 128 or more elements, see curve 2008, no grating lobe angles appear in the case with a boar sight main lobe. A bore sight main lobe has a direction perpendicular to the surface of the antenna aperture.

For a circular array the time delays of the waveform from/to element n can be calculated according to equation (29).

$$\tau_n(\theta)=\frac{D}{2\cdot c_0}\cdot\cos\left(\theta-n\cdot\frac{2\cdot\pi}{N}\right)\tag{29}$$

D=Antenna diameter

N=Number of antenna elements

Figure 21:
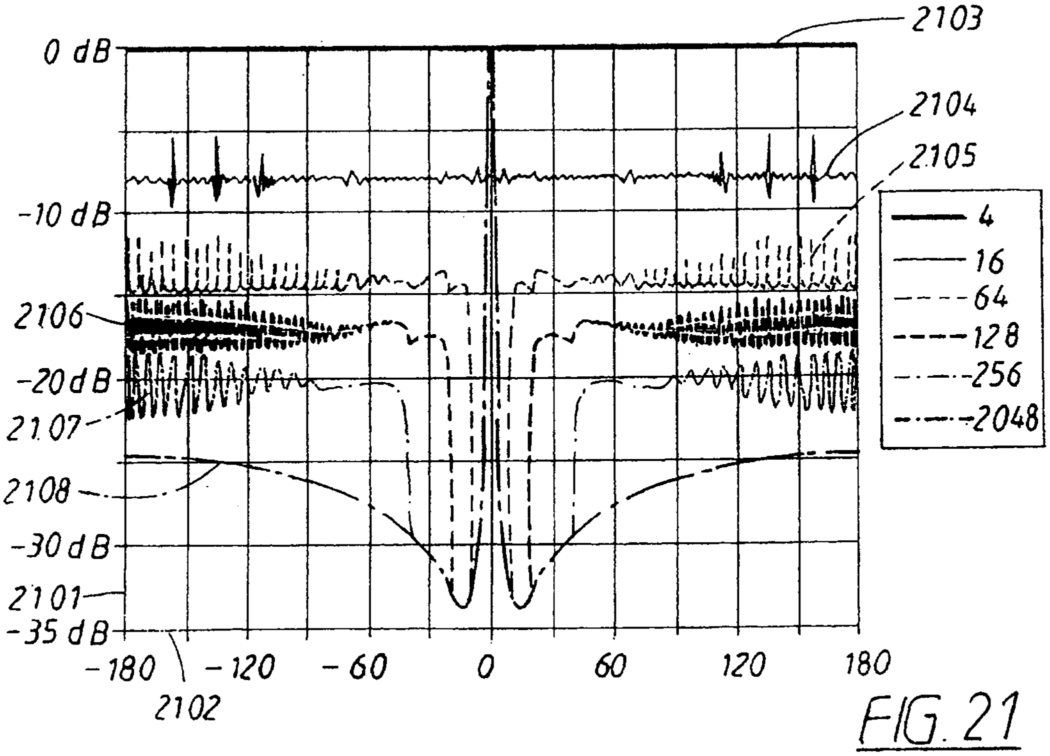
FIG. 21 shows antenna pattern for a circular array.

An example with white bandwidth limited Gaussian noise is shown in FIG. 21, calculated according to equation (8), in the transmit mode. FIG. 21 shows radiated power on the vertical axis 2101 as a function of the angle θ on the horizontal axis 2102. Curve 2103 includes 4 antenna elements, curve 2104 16 antenna elements, curve 2105 64 antenna elements, curve 2106 128 antenna elements, curve 2107 256 antenna elements and curve 2108 2048 antenna elements.

In FIGS. 20 and 21 no grating lobes are created as they are located at different angles for different parts of the used spectrum. The side lobe level for a fixed frequency, or narrow band antenna, with equal distribution of power is, as is well known to the skilled person, −13 dB. The same level for the wideband array antenna as described above corresponds to about 32 elements for the linear array as can be seen in FIG. 20. This means a separation between antenna elements of approximately 65 mm. To achieve electronic control of an array antenna the antenna elements are normally separated one half wavelength of the maximum frequency within the system bandwidth, in this example equal to the instantaneous bandwidth B In this example with a maximum frequency of 18 GHz this means a separation of 8.3 mm. The number of antenna elements then becomes 240. This "array thin out" feature is only valid when the wideband array antenna is operated with an instantaneously wideband waveform.

A wideband array antenna 301 according to prior art, operational over a system bandwidth, and comprising at least two antenna elements ($E_1$-$E_N$), can thus be arranged to control an antenna pattern of the wideband array antenna when connected to an electronic system 303. The antenna pattern control is then arranged to be achieved by affecting waveforms between the array antenna and the electronic system with parameters being individual for each antenna element. The parameters can in one embodiment be:

non frequency dependent attenuations and/or phase shifts non frequency dependent attenuations and/or time delays.

In another embodiment the parameters can be:

frequency dependent attenuations and/or phase shifts frequency dependent attenuations and/or time delays.

According to this "array thin out" embodiment of the invention a wideband array antenna instantaneously occupying the instantaneous bandwidth B is accomplished by a separation between antenna elements in the array antenna being increased to above one half wavelength of a maximum frequency within the system bandwidth when the wideband array antenna is arranged to operate with an instantaneously wideband waveform, thus resulting in a substantially reduced number of antenna elements ($E_1$-$E_N$) needed compared to conventional array antenna designs without the appearance of grating lobes in the antenna pattern.

In all embodiments of the invention, except the "array thin out" embodiment, the instantaneous bandwidth B can be both wide and narrow. The "array thin out" embodiment requires a wide instantaneous bandwidth.

For a wideband array antenna arranged to operate with an instantaneously wideband waveform the separation between antenna elements in the array antenna can as described be increased to above one half wavelength of a maximum frequency within the system bandwidth, in this example equal to the instantaneous bandwidth B. In the described example only 13% of the antenna elements are required compared to the fixed frequency or narrow band antenna solution. In a two or three dimension wideband array antenna even greater reduction of required number of antenna elements are possible. A wideband array antenna instantaneously occupying an instantaneous bandwidth B thus can be accomplished with a drastically reduced number of antenna elements in any wideband array antenna when operating with a waveform with high instantaneous bandwidth. This has the obvious advantage of reducing costs for the wideband array antenna. The connection of the wideband array antenna to the electronic system can be made either directly or indirectly via transforming means or other electronic components.

The invention is not limited to the embodiments of the description, but may vary freely within the scope of the appended claims. An example of this is a variation of the embodiment described in FIG. 1*a*.

In the embodiment described in FIG. 1*a* the transforming unit is inserted between each antenna element and the electronic system. A variation of this solution within the scope of the invention is that a common IFT unit is used for all antenna elements/sub arrays, i.e. the waveform from each antenna element/sub array is processed in a separate FT unit for each antenna element/sub array but the sum of the spectral component q from each antenna element/sub array after suitable time delay or phase shift and/or attenuation/amplification are processed in a common IFT unit.

The invention claimed is:

1. A method to control an antenna pattern of a wideband array antenna connected to an electronic system and comprising: at least two antenna elements, the antenna pattern control comprising control of the directions of one or several main lobe/s and/or cancellation directions in the antenna pattern, the control being achieved by affecting waveforms between the antenna elements and the electronic system with phase shifts or time delays being individual for each antenna element, including that a wideband array antenna unit, comprising the wideband array antenna and transforming means, the wideband array antenna being operational over a system bandwidth and operating with an instantaneous bandwidth B, is accomplished by:

the transforming means being inserted between each antenna element or sub array ($E_1$-$E_N$) in the wideband array antenna and the electronic system, a sub array comprising at least two antenna elements, or the transforming means being integrated in the antenna element/sub array or the electronic system, a weighting function W(ω) being calculated for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component, and the transforming means affecting the waveforms between each antenna element or sub array ($E_1$-$E_N$) and the electronic system, the waveforms being continuous or pulsed, by use of one or several parameters calculated from the weighting function W(ω) at discrete angular frequencies $\omega_q$, thus achieving extended control of the antenna pattern of the wideband array antenna over the instantaneous bandwidth B the extended control comprising the control of direction and width of one or several main lobe/s having frequency independent position and control of a number of wideband cancellation directions.

2. The method according to claim 1, comprising that the extended control of the antenna pattern further comprises controlling characteristics such as the shape, and the side lobe levels in different directions in the antenna pattern.

3. The method according to claim 2, comprising that the transforming means affects the waveforms between each antenna element or sub array ($E_1$-$E_N$) and the electronic system with one parameter being frequency dependent and comprising a frequency dependent time delay τ(ω) or a frequency dependent phase shift ϕ(ω).

4. The method according to claim 2, comprising that the transforming means affects the waveforms between each antenna element or sub array ($E_1$-$E_N$) and the electronic system with one parameter being frequency dependent and comprising a frequency dependent attenuation/amplification A(ω).

5. The method according to claim 2, comprising that the transforming means affects the waveforms between each antenna element or sub array ($E_1$-$E_N$) and the electronic system with two parameters being frequency dependent and comprising a frequency dependent time delay τ(ω) or frequency dependent phase shift ϕ(ω) and a frequency dependent attenuation/amplification A(ω).

6. The method according to claim 2, comprising that the transforming means receives an input waveform $s_{in}(m \cdot T)$:

the input waveform being successively time delayed in Q−1 time steps T, numbered from 1 to Q−1 and being time delayed copies of the input waveform $s_{in}(m \cdot T)$, and Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are calculated as the Inverse Fourier Transformation (IFT) of W(ω) for the Q spectral components q, resulting from dividing the instantaneous bandwidth B in Q components, the calculation being performed for each antenna element or sub array ($E_1$-$E_N$) using the standard methods and taking into account design requests valid for a centre frequency $f_q$ of each spectral component, the input waveform $s_{in}(m \cdot T)$ being multiplied with the first weighting coefficient $w_{n,0}$ and each time delayed copy of the input waveform being successively multiplied with the weighting coefficient having the same second index as the number of time step delays T included in the time delayed copy of the input waveform, the result of each multiplication being summed to an output waveform $s_{out}(m \cdot T)$.

7. The method according to claim 2, comprising:

specifying wave form data;

calculating the weighting function $W(\omega)$ for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

8. The method according to claim 2, comprising that the waveforms between each antenna element or sub array ($E_1$-$E_N$) and the electronic system are pulsed or continuous waveforms.

9. The method according to claim 2, comprising that the wideband array antenna unit is realized using the analogue transforming means.

10. The method according to claim 1, comprising that the transforming means affects the waveforms between each antenna element or sub array ($E_1$-$E_N$) and the electronic system with one parameter being frequency dependent and comprising a frequency dependent time delay $\tau(\omega)$ or a frequency dependent phase shift $\phi(\omega)$.

11. The method according to claim 10, comprising that frequency dependency of the time delay $\tau(\omega)$ or phase shift $\phi(\omega)$ for each antenna element or sub array ($E_1$-$E_N$) is calculated for each spectral component q according to the standard methods thus achieving that the direction of one or several main lobe/s can be controlled and fixed over the instantaneous bandwidth B and one or several cancellation directions can be controlled and fixed over the instantaneous bandwidth B.

12. The method according to claim 10, comprising that the transforming means comprises a Fourier Transformation (FT) unit, the FT unit accomplishing the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is affecting each spectral component q through time delay and/or attenuation/amplification means, all spectral components being fed to an Inverse Fourier Transformation (IFT) unit transforming all spectral components back into the time domain and producing an output waveform $s_{out}(t)$ from each transforming means.

13. The method according to claim 12, comprising that the input waveforms $s_{in}(t)$ are received from antenna elements or sub arrays ($E_1$-$E_N$) and that the output waveforms $s_{out}(t)$ are fed to the electronic system and that a first, or a third control element is used as transforming means to transform the input waveforms $s_{in}(t)$ to the output waveforms $s_{out}(t)$.

14. The method according to claim 12, comprising that the input waveforms $s_{in}(t)$ are received from a waveform generator in the electronic system, that the output waveforms $s_{out}(t)$ are fed to antenna elements or sub arrays ($E_1$-$E_N$) and that a first, a third or a fourth control element is used as transforming means to transform the input waveforms $s_{in}(t)$ to the output waveforms $s_{out}(t)$.

15. The method according to claim 12, comprising:

specifying wave form data;

calculating the weighting function $W(\omega)$ for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

16. The method according to claim 12, comprising that the waveforms between each antenna element or sub array ($E_1$-$E_N$) and the electronic system are pulsed or continuous waveforms.

17. The method according to claim 10, comprising:

specifying wave form data;

calculating the weighting function $W(\omega)$ for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

18. The method according to claim 10, comprising that the waveforms between each antenna element or sub array ($E_1$-$E_N$) and the electronic system are pulsed or continuous waveforms.

19. The method according to claim 10, comprising that the wideband array antenna unit is realized using the analogue transforming means.

20. The method according to claim 1, comprising that the transforming means affects the waveforms between each antenna element or sub array ($E_1$-$E_N$) and the electronic system with one parameter being frequency dependent and comprising a frequency dependent attenuation/amplification $A(\omega)$.

21. The method according to claim 20, comprising that frequency dependency of the attenuation/amplification $A(\omega)$ for each antenna element or subarray ($E_1$-$E_N$) is calculated for each spectral component q according to the standard methods thus achieving that the width of the main lobe can be controlled and fixed over the instantaneous bandwidth B.

22. The method according to claim 20, comprising that the transforming means comprises a Fourier Transformation (FT) unit, the FT unit accomplishing the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is affecting each spectral component q through time delay and/or attenuation/amplification means, all spectral components being fed to an Inverse Fourier Transformation (IFT) unit transforming all spectral components back into the time domain and producing an output waveform $s_{out}(t)$ from each transforming means.

23. The method according to claim 20, comprising:
specifying wave form data;
calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and
realizing the array antenna in the frequency domain using the first or third control element or realizing the array antenna in the time domain using the second control element or realizing the array antenna using the fourths control element comprising a Direct Digital Synthesis (DDS) unit.

24. The method according to claim 20, comprising that the waveforms between each antenna element or sub array ($E_1$-$E_N$) and the electronic system are pulsed or continuous waveforms.

25. The method according to claim 20, comprising that the wideband array antenna unit is realized using the analogue transforming means.

26. The method according to claim 1, comprising that the transforming means affects the waveforms between each antenna element or sub array ($E_1$-$E_N$) and the electronic system with two parameters being frequency dependent and comprising a frequency dependent time delay τ(ω) or frequency dependent phase shift ϕ(ω) and a frequency dependent attenuation/amplification A(ω).

27. The method according to claim 26, comprising that the transforming means affects the waveforms between each antenna element or sub array ($E_1$-$E_N$) and the electronic system, by use of the frequency dependent time delay τ(ω) or frequency dependent phase shift ϕ(ω) and the frequency dependent attenuation/amplification A(ω), the parameters being individual for each antenna element or sub array, such that each waveform between each antenna element or sub array ($E_1$-$E_N$) and the electronic system is affected by the frequency dependent time delay τ(ω) or the frequency dependent phase shift ϕ(ω) and the frequency dependent attenuation A(ω) in response to the frequency dependent weighting function W(ω).

28. The method according to claim 27, comprising that frequency dependency of the time delay τ(ω) or frequency dependency of the phase shift ϕ(ω) and the frequency dependency of the attenuation/amplification A(ω) is calculated for each spectral component q according to the standard methods thus achieving that the direction and width of the main lobe can be controlled and fixed over the instantaneous bandwidth B and one or several cancellation directions can be controlled and fixed over the instantaneous bandwidth B.

29. The method according to claim 26, comprising that the transforming means comprises a Fourier Transformation (FT) unit, the FT unit accomplishing the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is affecting each spectral component q through time delay and/or attenuation/amplification means, all spectral components being fed to an Inverse Fourier Transformation (IFT) unit transforming all spectral components back into the time domain and producing an output waveform $s_{out}(t)$ from each transforming means.

30. The method according to claim 26, comprising:
specifying wave form data;
calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and
realizing the array antenna in the frequency domain using the first or third control element or realizing the array antenna in the time domain using the second control element or realizing the array antenna using the fourths control element comprising a Direct Digital Synthesis (DDS) unit.

31. The method according to claim 26, comprising that the waveforms between each antenna element or sub array ($E_1$-$E_N$) and the electronic system are pulsed or continuous waveforms.

32. The method according to claim 26, comprising that the wideband array antenna unit is realized using the analogue transforming means.

33. The method according to claim 1, comprising that the transforming means receives an input waveform $s_{in}(m \cdot T)$:
the input waveform being successively time delayed in Q−1 time steps T, numbered from 1 to Q−1 and being time delayed copies of the input waveform $s_{in}(m \cdot T)$, and
Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are calculated as the Inverse Fourier Transformation (IFT) of W(ω) for the Q spectral components q, resulting from dividing the instantaneous bandwidth B in Q components, the calculation being performed for each antenna element or sub array ($E_1$-$E_N$) using the standard methods and taking into account design requests valid for a centre frequency $f_q$ of each spectral component,
the input waveform $s_{in}(m \cdot T)$ being multiplied with the first weighting coefficient $w_{n,0}$ and each time delayed copy of the input waveform being successively multiplied with the weighting coefficient having the same second index as the number of time step delays T included in the time delayed copy of the input waveform, the result of each multiplication being summed to an output waveform $s_{out}(m \cdot T)$.

34. The method according to claim 33, comprising that the first x weighting coefficients and the last y weighting coefficients in the series of weighting coefficients $w_{n,0}$ to $w_{n,Q-1}$ are set to zero and that the first x time delays T are integrated into a time delay D, equal to x·T and the last y multiplications are excluded thus reducing the number of required operations to less than Q operations.

35. The method according to claim 34, comprising that one input signal $s_{in}(m \cdot T)$ is emitted from each antenna element or sub array ($E_1$-$E_N$) and that the output waveforms $s_{out}(m \cdot T)$ are fed to the electronic system and that a second control element is used as the transforming means to transform the input waveforms $s_{in}(t)$ to the output waveforms $s_{out}(t)$.

36. The method according to claim 34, comprising that one input waveform $s_{in}(m \cdot T)$ for each antenna element or sub array ($E_1$-$E_N$) is emitted from a waveform generator in the electronic system, that each output waveform $s_{out}(m \cdot T)$ is fed to an antenna element or sub array and that a second, or a fourth control element is used as the transforming means to transform the input waveform $s_{in}(t)$ to the output waveform $s_{out}(t)$.

37. The method according to claim 33, comprising that one input signal $s_{in}(m \cdot T)$ is emitted from each antenna element or sub array ($E_1$-$E_N$) and that the output waveforms $s_{out}(m \cdot T)$ are fed to the electronic system and that a second control element is used as the transforming means to transform the input waveforms $s_{in}(t)$ to the output waveforms $s_{out}(t)$.

38. The method according to claim 33, comprising that one input waveform $s_{in}(m \cdot T)$ for each antenna element or sub array ($E_1$-$E_N$) is emitted from a waveform generator in the electronic system, that each output waveform $s_{out}(m \cdot T)$ is fed to an antenna element or sub array and that a second, or a fourth control element is used as the transforming means to transform the input waveform $s_{in}(t)$ to the output waveform $s_{out}(t)$.

39. The method according to claim 33, comprising:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

40. The method according to claim 33, comprising that the waveforms between each antenna element or sub array ($E_1$-$E_N$) and the electronic system are pulsed or continuous waveforms.

41. The method according to claim 1, comprising:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component, and realizing the array antenna in the frequency domain using the first or third control element or realizing the array antenna in the time domain using the second control element or realizing the array antenna using the fourths control element comprising a Direct Digital Synthesis (DDS) unit.

42. The method according to claim 1, comprising that the waveforms between each antenna element or sub array ($E_1$-$E_N$) and the electronic system are pulsed or continuous waveforms.

43. The method according to claim 1, comprising that the wideband array antenna unit is realized using the analogue transforming means.

44. A wideband array antenna unit arranged to control an antenna pattern of a wideband array antenna connected to an electronic system and comprising at least two antenna elements ($E_1$-$E_N$), the antenna pattern control comprising control of the directions of one or several main lobe/s and/or cancellation directions in the antenna pattern, the antenna pattern control being arranged to be achieved by affecting waveforms between the antenna elements and the electronic system with phase shifts or time delays being individual for each antenna element, wherein the wideband array antenna unit, comprising the wideband array antenna and transforming means, the wideband array antenna being arranged to be operational over a system bandwidth and being arranged to operate with an instantaneous bandwidth B, is accomplished by:

the transforming means being arranged between each antenna element or sub array ($E_1$-$E_N$) in the wideband array antenna and the electronic system, a sub array comprising at least two antenna elements, or the transforming means being integrated in the antenna element/sub array or the electronic system, a weighting function W(ω) being arranged to be calculated for Q spectral components q, resulting from dividing the instantaneous bandwidth B in Q components q being an integer index ranging from 0 to Q−1, for each antenna element or sub array ($E_1$-$E_N$) using standard methods taking into account design requests valid for a centre frequency $f_q$ of each spectral component, and the transforming means being arranged to affect the waveforms between each antenna element or sub array ($E_1$-$E_N$) and the electronic system, the waveforms being continuous or pulsed, by use of one or several parameters calculated from the weighting function W(ω) at discrete angular frequencies $\omega_q$, thus achieving extended control of the antenna pattern of the wideband array antenna over the instantaneous bandwidth B the extended control comprising the control of direction and width of one or several main lobe/s having frequency independent position and control of a number of wideband cancellation directions.

45. The wideband array antenna unit according to claim 44, comprising that the extended control of the antenna pattern further comprises means for controlling characteristics such as the shape, and the side lobe levels in different directions in the antenna pattern.

46. The wideband array antenna unit according to claim 45, comprising that the transforming means are arranged to affect the waveforms between each antenna element or sub array ($E_1$-$E_N$) and the electronic system with one parameter being frequency dependent and comprising a frequency dependent time delay τ(ω) or a frequency dependent phase shift ϕ(ω).

47. The wideband array antenna unit according to claim 45, comprising that the transforming means is arranged to affect the waveforms between each antenna element or sub array ($E_1$-$E_N$) and the electronic system with one parameter being frequency dependent and comprising a frequency dependent attenuation/amplification A(ω).

48. The wideband array antenna unit according to claim 45, comprising that the transforming means is arranged to affect the waveforms between each antenna element or sub array ($E_1$-$E_N$) and the electronic system with two parameters being frequency dependent and comprising a frequency dependent time delay τ(ω) or a frequency dependent phase shift ϕ(ω) and a frequency dependent attenuation/amplification A(ω).

49. The wideband array antenna unit according to claim 45, comprising that the transforming means is arranged to receive an input waveform $s_{in}(m \cdot T)$:

the input waveform being arranged to be successively time delayed in Q−1 time steps T, numbered from 1 to Q−1 and being time delayed copies of the input waveform $s_{in}(m \cdot T)$, and Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are arranged to be calculated as the Inverse Fourier Transformation (IFT) of W(ω) for the Q spectral components q, resulting from dividing the instantaneous bandwidth B in Q components, the calculation being performed for each antenna element or sub array ($E_1$-$E_N$) using the standard methods and taking into account design requests valid for a centre frequency $f_q$ of each spectral component, the input waveform $s_{in}(m\cdot T)$ being arranged to be multiplied with the first weighting coefficient $w_{n,0}$ and each time delayed copy of the input waveform being arranged to be successively multiplied with the weighting coefficient having the same second index as the number of time step delays T included in the time delayed copy of the input waveform, the result of each multiplication being arranged to be summed to an output waveform $s_{out}(m\cdot T)$.

50. The wideband array antenna unit according to claim 45, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

51. The wideband array antenna unit according to claim 45, comprising that the waveforms between each antenna element or sub array ($E_1$-$E_N$) and the electronic system are arranged to be pulsed or continuous waveforms.

52. The wideband array antenna unit according to claim 45, comprising that the wideband array antenna unit comprises the analogue transforming means.

53. The wideband array antenna unit according to claim 44, comprising that the transforming means are arranged to affect the waveforms between each antenna element or sub array ($E_1$-$E_N$) and the electronic system with one parameter being frequency dependent and comprising a frequency dependent time delay τ(ω) or a frequency dependent phase shift ϕ(ω).

54. The wideband array antenna unit according to claim 53, comprising that frequency dependency of the time delay τ(ω) or phase shift ϕ(ω) for each antenna element or sub array ($E_1$-$E_N$) is arranged to be calculated for each spectral component q according to the standard method thus achieving that the direction of one or several main lobe/s can be arranged to be controlled and fixed over the instantaneous bandwidth B and one or several cancellation directions can be arranged to be controlled and fixed over the instantaneous bandwidth B.

55. The wideband array antenna unit according to claim 53, comprising that the transforming means comprises a Fourier Transformation (FT) unit, the FT unit is arranged to accomplish the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is arranged to affect each spectral component q through time delay and/or attenuation/amplification means, all spectral components are connected to an Inverse Fourier Transformation (IFT) unit arranged to transform all spectral components back into the time domain and to produce an output waveform $s_{out}(t)$ from each transforming means.

56. The wideband array antenna unit according to claim 55, comprising that the input waveforms $s_{in}(t)$ are arranged to be received from antenna elements or sub arrays ($E_1$-$E_N$) and that the output waveforms $s_{out}(t)$ are connected to the electronic system and that a first or a third control element is arranged to be used as transforming means to transform the input waveforms $s_{in}(t)$ to the output waveforms $s_{out}(t)$.

57. The wideband array antenna unit according to claim 55, comprising that the input waveforms $s_{in}(t)$ are arranged to be received from a waveform generator in the electronic system, that the output waveforms $s_{out}(t)$ are connected to antenna elements or sub arrays ($E_1$-$E_N$) and that a first, a third or fourth control element is arranged to be used as transforming means to transform the input waveforms $s_{in}(t)$ to the output waveforms $s_{out}(t)$.

58. The wideband array antenna unit according to claim 55, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

59. The wideband array antenna unit according to claim 55, comprising that the waveforms between each antenna element or sub array ($E_1$-$E_N$) and the electronic system are arranged to be pulsed or continuous waveforms.

60. The wideband array antenna unit according to claim 53, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

61. The wideband array antenna unit according to claim 53, comprising that the waveforms between each antenna element or sub array ($E_1$-$E_N$) and the electronic system are arranged to be pulsed or continuous waveforms.

62. The wideband array antenna unit according to claim 53, comprising that the wideband array antenna unit comprises the analogue transforming means.

63. The wideband array antenna unit according to claim 44, comprising that the transforming means is arranged to affect the waveforms between each antenna element or sub array ($E_1$-$E_N$) and the electronic system with one parameter being frequency dependent and comprising a frequency dependent attenuation/amplification A(ω).

64. The wideband array antenna unit according to claim 63, comprising that frequency dependency of the attenuation/amplification A(ω) for each antenna element or subarray ($E_1$-$E_N$) is arranged to be calculated for each spectral component q according to the standard methods thus achieving that the width of the main lobe can be arranged to be controlled and fixed over the instantaneous bandwidth B.

65. The wideband array antenna unit according to claim 63, comprising that the transforming means comprises a Fourier Transformation (FT) unit, the FT unit is arranged to accomplish the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is arranged to affect each spectral component q through time delay and/or attenuation/amplification means, all spectral components are connected to an Inverse Fourier Transformation (IFT) unit arranged to transform all spectral components back into the time domain and to produce an output waveform $s_{out}(t)$ from each transforming means.

66. The wideband array antenna unit according to claim 63, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

67. The wideband array antenna unit according to claim 63, comprising that the waveforms between each antenna element or sub array ($E_1$-$E_N$) and the electronic system are arranged to be pulsed or continuous waveforms.

68. The wideband array antenna unit according to claim 63, comprising that the wideband array antenna unit comprises the analogue transforming means.

69. The wideband array antenna unit according to claim 44, comprising that the transforming means is arranged to affect the waveforms between each antenna element or sub array ($E_1$-$E_N$) and the electronic system with two parameters being frequency dependent and comprising a frequency dependent time delay τ(ω) or a frequency dependent phase shift ϕ(ω) and a frequency dependent attenuation/amplification A(ω).

70. The wideband array antenna unit according to claim 69, comprising that the transforming means is arranged to affect the waveforms between each antenna element or sub array ($E_1$-$E_N$) and the electronic system, by use of the frequency dependent time delay τ(ω) or a frequency dependent phase shift ϕ(ω) and the frequency dependent attenuation/amplification A(ω), the parameters being individual for each antenna element or sub array, such that each waveform between each antenna element or sub array ($E_1$-$E_N$) and the electronic system is affected by the frequency dependent time delay τ(ω) or the frequency dependent phase shift ϕ(ω) and the frequency dependent attenuation A(ω) in response to the frequency dependent weighting function W(ω).

71. The wideband array antenna unit according to claim 70, comprising that frequency dependency of the time delay τ(ω) or frequency dependency of the phase shift ϕ(ω) and the frequency dependency of the attenuation/amplification A(ω) is arranged to be calculated for each spectral component q according to the standard methods thus achieving that the direction and width of the main lobe can be arranged to be controlled and fixed over the instantaneous bandwidth B and one or several cancellation directions can be arranged to be controlled and fixed over instantaneous bandwidth B.

72. The wideband array antenna unit according to claim 69, comprising that the transforming means comprises a Fourier Transformation (FT) unit, the FT unit is arranged to accomplish the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is arranged to affect each spectral component q through time delay and/or attenuation/amplification means, all spectral components are connected to an Inverse Fourier Transformation (IFT) unit arranged to transform all spectral components back into the time domain and to produce an output waveform $s_{out}(t)$ from each transforming means.

73. The wideband array antenna unit according to claim 69, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

74. The wideband array antenna unit according to claim 69, comprising that the waveforms between each antenna element or sub array ($E_1$-$E_N$) and the electronic system are arranged to be pulsed or continuous waveforms.

75. The wideband array antenna unit according to claim 69, comprising that the wideband array antenna unit comprises the analogue transforming means.

76. The wideband array antenna unit according to claim 44, comprising that the transforming means is arranged to receive an input waveform $s_{in}(m \cdot T)$:

the input waveform being arranged to be successively time delayed in Q−1 time steps T, numbered from 1 to Q−1 and being time delayed copies of the input waveform $s_{in}(m \cdot T)$, and Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are arranged to be calculated as the Inverse Fourier Transformation (EFT) of W(ω) for the Q spectral components q, resulting from dividing the instantaneous bandwidth B in Q components, the calculation being performed for each antenna element or sub array ($E_1$-$E_N$) using the standard methods and taking into account design requests valid for a centre frequency $f_q$ of each spectral component, the input waveform $s_{in}(m \cdot T)$ being arranged to be multiplied with the first weighting coefficient $w_{n,0}$ and each time delayed copy of the input waveform being arranged to be successively multiplied with the weighting coefficient having the same second index as the number of time step delays T included in the time delayed copy of the input waveform, the result of each multiplication being arranged to be summed to an output waveform $s_{out}(m \cdot T)$.

77. The wideband array antenna unit according to claim 76, comprising that the first x weighting coefficients and the last y weighting coefficients in the series of weighting coefficients $w_{n,0}$ to $w_{n,Q-1}$ are arranged to be set to zero and that the first x time delays T are arranged to be integrated into a time delay D, equal to x·T and the last y multiplications are excluded thus reducing the number of required operations to less than Q operations.

78. The wideband array antenna unit according to claim 77, comprising that one input waveform $s_{in}(m \cdot T)$ is arranged to be emitted from each antenna element or sub array ($E_1$-$E_N$) and that the output waveforms $s_{out}(m \cdot T)$ are connected to the electronic system and that a second control element is arranged to be used as the transforming means to transform the input waveforms $s_{in}(t)$ to the output waveforms $s_{out}(t)$.

79. The wideband array antenna unit according to claim 77, comprising that one input waveform $s_{in}(m \cdot T)$ for each antenna element or sub array ($E_1$-$E_N$) is arranged to be emitted from a waveform generator in the electronic system, that each output waveform $s_{out}(m \cdot T)$ is connected to an antenna element or sub array and that a second, or a fourth control element is arranged to be used as the transforming means to transform the input waveform $s_{in}(t)$ to the output waveform $s_{out}(t)$.

80. The wideband array antenna unit according to claim 76, comprising that one input waveform $s_{in}(m \cdot T)$ is arranged to be emitted from each antenna element or sub array ($E_1$-$E_N$) and that the output waveforms $s_{out}(m \cdot T)$ are connected to the electronic system and that a second control element is arranged to be used as the transforming means to transform the input waveforms $s_{in}(t)$ to the output waveforms $s_{out}(t)$.

81. The wideband array antenna unit according to claim 76, comprising that one input waveform $s_{in}(m \cdot T)$ for each antenna element or sub array ($E_1$-$E_N$) is arranged to be emitted from a waveform generator in the electronic system, that each output waveform $s_{out}(m \cdot T)$ is connected to an antenna element or sub array and that a second, or a fourth control element is arranged to be used as the transforming means to transform the input waveform $s_{in}(t)$ to the output waveform $s_{out}(t)$.

82. The wideband array antenna unit according to claim 76, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

83. The wideband array antenna unit according to claim 76, comprising that the waveforms between each antenna element or sub array ($E_1$-$E_N$) and the electronic system are arranged to be pulsed or continuous waveforms.

84. The wideband array antenna unit according to claim 44, comprising that the wideband array antenna unit comprises the means for:

specifying wave form data;

calculating the weighting function W(ω) for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component; and realizing the array antenna in the frequency domain using the first or third control element or realizing the array antenna in the time domain using the second control element or realizing the array antenna using the fourths control element comprising a Direct Digital Synthesis (DDS) unit.

85. The wideband array antenna unit according to claim 44, comprising that the waveforms between each antenna element or sub array ($E_1$-$E_N$) and the electronic system are arranged to be pulsed or continuous waveforms.

86. The wideband array antenna unit according to claim 44, comprising that the wideband array antenna unit comprises the analogue transforming means.

87. A transforming means arranged to control an antenna pattern of an antenna system connected to an electronic system, the antenna system comprising: at least two antenna elements, the antenna pattern control comprising control of the directions of one or several main lobe/s and/or cancellation directions in the antenna pattern, the control being arranged to be achieved by affecting waveforms between the antenna elements and the electronic system with phase shifts or time delays being individual for each antenna element, wherein an extended control of the antenna pattern arranged to occupy an instantaneous bandwidth B is accomplished by:

the transforming means being arranged between at least all but one of the antenna elements or sub arrays ($E_1$-$E_N$) in the antenna system and the electronic system, a sub array comprising at least two antenna elements, or the transforming means being integrated in the antenna element/sub array or the electronic system, a weighting function W(ω) arranged to be calculated for Q spectral components q, resulting from dividing the instantaneous bandwidth B in Q components, q being an integer index ranging from 0 to Q−1, for each antenna element or sub array ($E_1$-$E_N$) using standard methods taking into account design requests valid for a centre frequency $f_q$ of each spectral component, and the transforming means arranged to affect the waveforms between at least all but one of the antenna elements or sub arrays ($E_1$-$E_N$) and the electronic system, the waveforms being continuous or pulsed, by use of one or several parameters calculated from the weighting function W(ω) at discrete angular frequencies $\omega_q$, thus achieving the extended control of the antenna pattern of the antenna system over the instantaneous bandwidth B the extended control comprising the control of direction and width of one or several main lobe/s having frequency independent position and control of a number of wideband cancellation directions.

88. The transforming means according to claim 87, comprising that the extended control of the antenna pattern further comprises means for controlling characteristics such as the shape, and the side lobe levels in different directions in the antenna pattern.

89. The transforming means according to claim 88, comprising that the transforming means comprises a Fourier Transformation (FT) unit, the FT unit is arranged to accomplish the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is arranged to affect each spectral component q through time delay and/or attenuation/amplification means, all spectral components are connected to an Inverse Fourier Transformation (IFT) unit arranged to transform all spectral components back into the time domain and to produce an output waveform $s_{out}(t)$ from each transforming means.

90. The transforming means according to claim 88, comprising that the transforming means is arranged to receive an input waveform $s_{in}(m \cdot T)$:

the input waveform being arranged to be successively time delayed in Q−1 time steps T, numbered from 1 to Q−1 and being time delayed copies of the input waveform $s_{in}(m \cdot T)$, and Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are arranged to be calculated as the Inverse Fourier Transformation (IFT) of W(ω) for the Q spectral components q, resulting from dividing the instantaneous bandwidth B in Q components, the calculation being performed for each antenna element or sub array ($E_1$-$E_N$) using standard methods and taking into account design requests valid for a centre frequency $f_q$ of each spectral component, the input waveform $s_{in}(m \cdot T)$ being arranged to be multiplied with the first weighting coefficient $w_{n,0}$ and each time delayed copy of the input waveform being arranged to be successively multiplied with the weighting coefficient having the same second index as the number of time step delays T included in the time delayed copy of the input waveform, the result of each multiplication being arranged to be summed to an output waveform $s_{out}(m \cdot T)$.

91. The transforming means according to claim 87, comprising that the antenna system comprises an array antenna with at least two antenna elements or a main antenna and an auxiliary antenna each comprising at least one antenna element or sub array.

92. The transforming means according to claim 91, comprising that the transforming means comprises a Fourier Transformation (FT) unit, the FT unit is arranged to accomplish the division into Q spectral components, 0 to Q−1, of an input waveform $s_{in}(t)$ to each transforming means, each spectral component having a centre frequency $f_q$, and the frequency dependent parameters time delay $\tau_q$ and/or attenuation/amplification $a_q$ are/is arranged to affect each spectral component q through time delay and/or attenuation/amplification means, all spectral components are connected to an Inverse Fourier Transformation (IFT) unit arranged to transform all spectral components back into the time domain and to produce an output waveform $s_{out}(t)$ from each transforming means.

93. The transforming means according to claim 91, comprising that the transforming means is arranged to receive an input waveform $s_{in}(m \cdot T)$:

the input waveform being arranged to be successively time delayed in Q−1 time steps T, numbered from 1 to Q−1 and being time delayed copies of the input waveform $s_{in}(m \cdot T)$, and Q parameters comprising weighting coefficients $w_{n,0}$ to $w_{n,Q-1}$ for antenna element n, identified with two indexes the first representing antenna element number and the second a consecutive number q representing a spectral component and ranging from 0 to Q−1, are arranged to be calculated as the Inverse Fourier Transformation (IFT) of W(ω) for the Q spectral components q, resulting from dividing the instantaneous bandwidth B in Q components, the calculation being performed for each antenna element or sub array ($E_1$-$E_N$) using standard methods and taking into account design requests valid for a centre frequency $f_q$ of each spectral component, the input waveform $s_{in}(m \cdot T)$ being arranged to be multiplied with the first weighting coefficient $w_{n,0}$ and each time delayed copy of the input waveform being arranged to be successively multiplied with the weighting coefficient having the same second index as the number of time step delays T included in the time delayed copy of the input waveform, the result of each multiplication being arranged to be summed to an output waveform $s_{out}(m \cdot T)$.

* * * * *